H. J. MITCHELL.
BOARD SIZING MACHINE.
APPLICATION FILED JUNE 25, 1915.
1,207,976.
Patented Dec. 12, 1916.
18 SHEETS—SHEET 3.
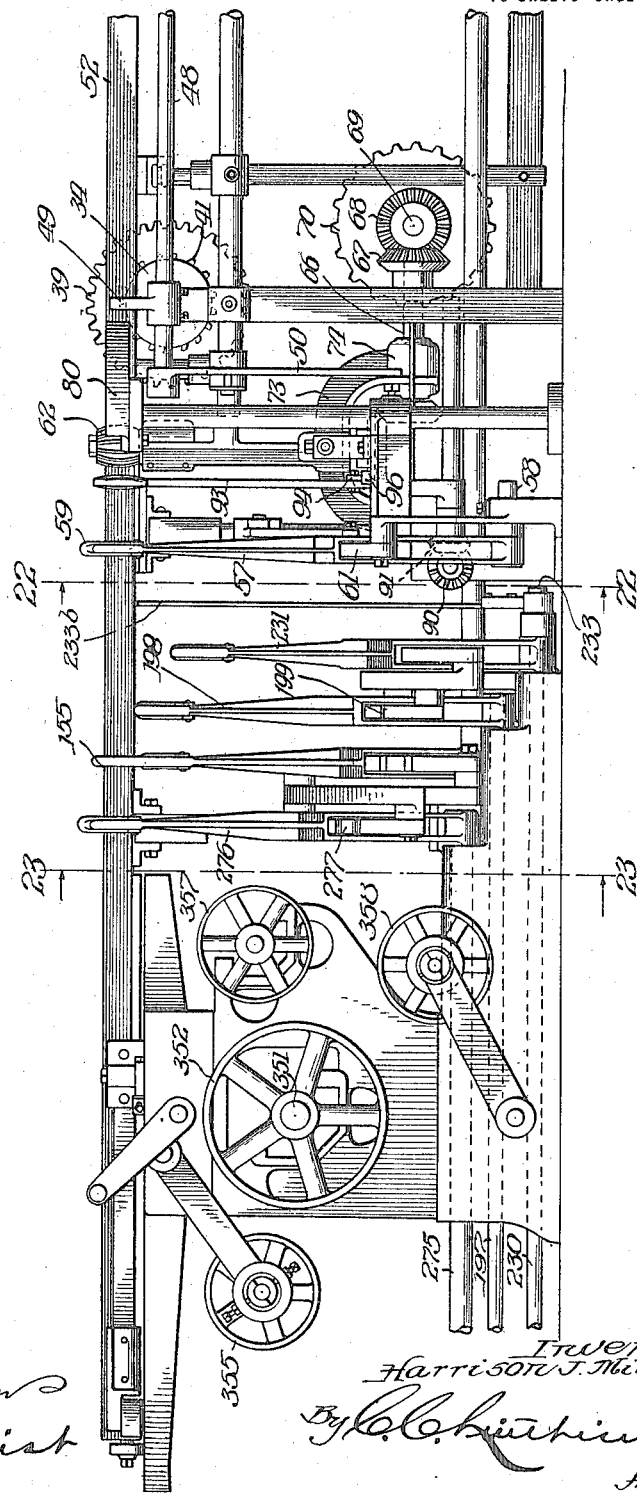
Witnesses:
Inventor
Harrison J. Mitchell

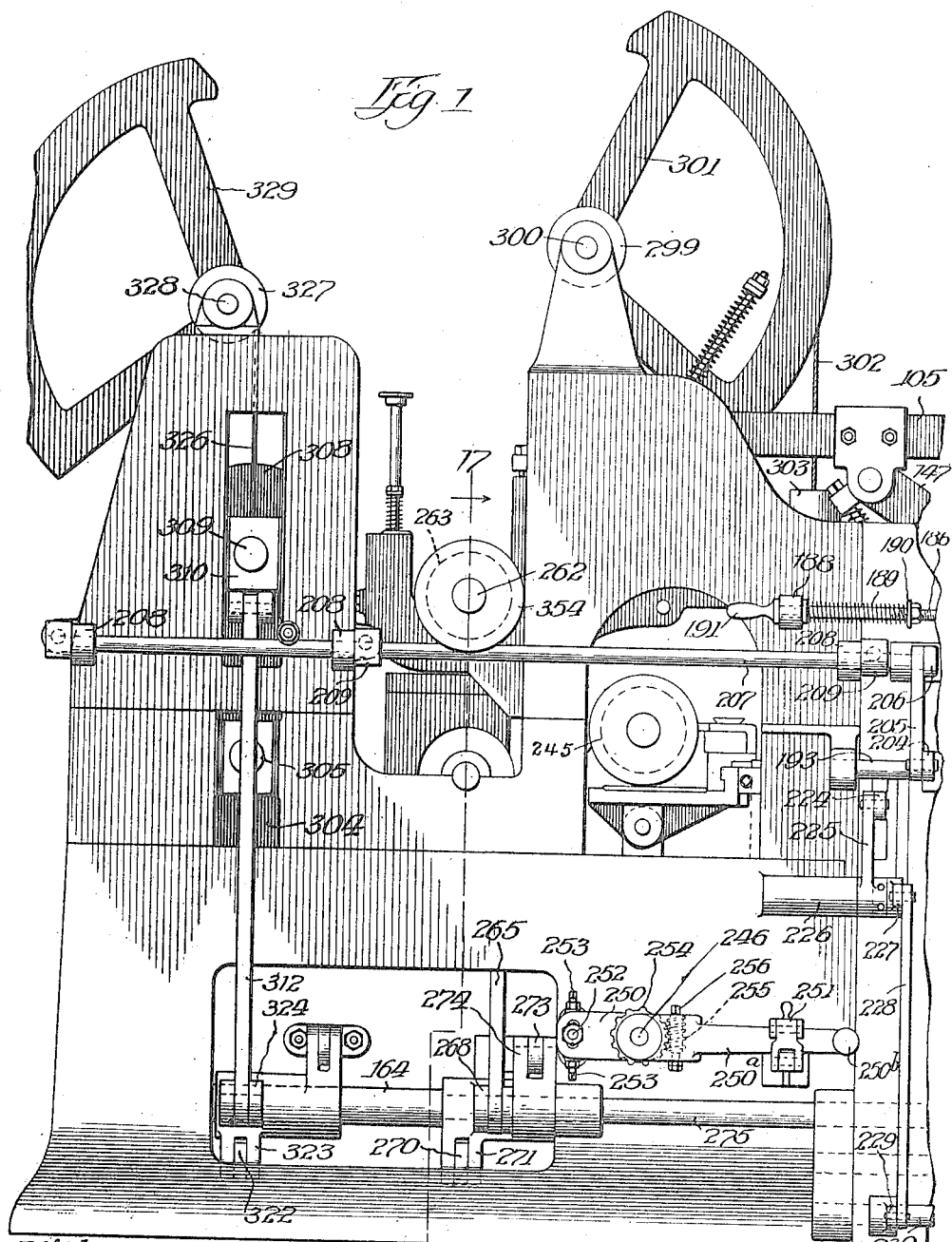

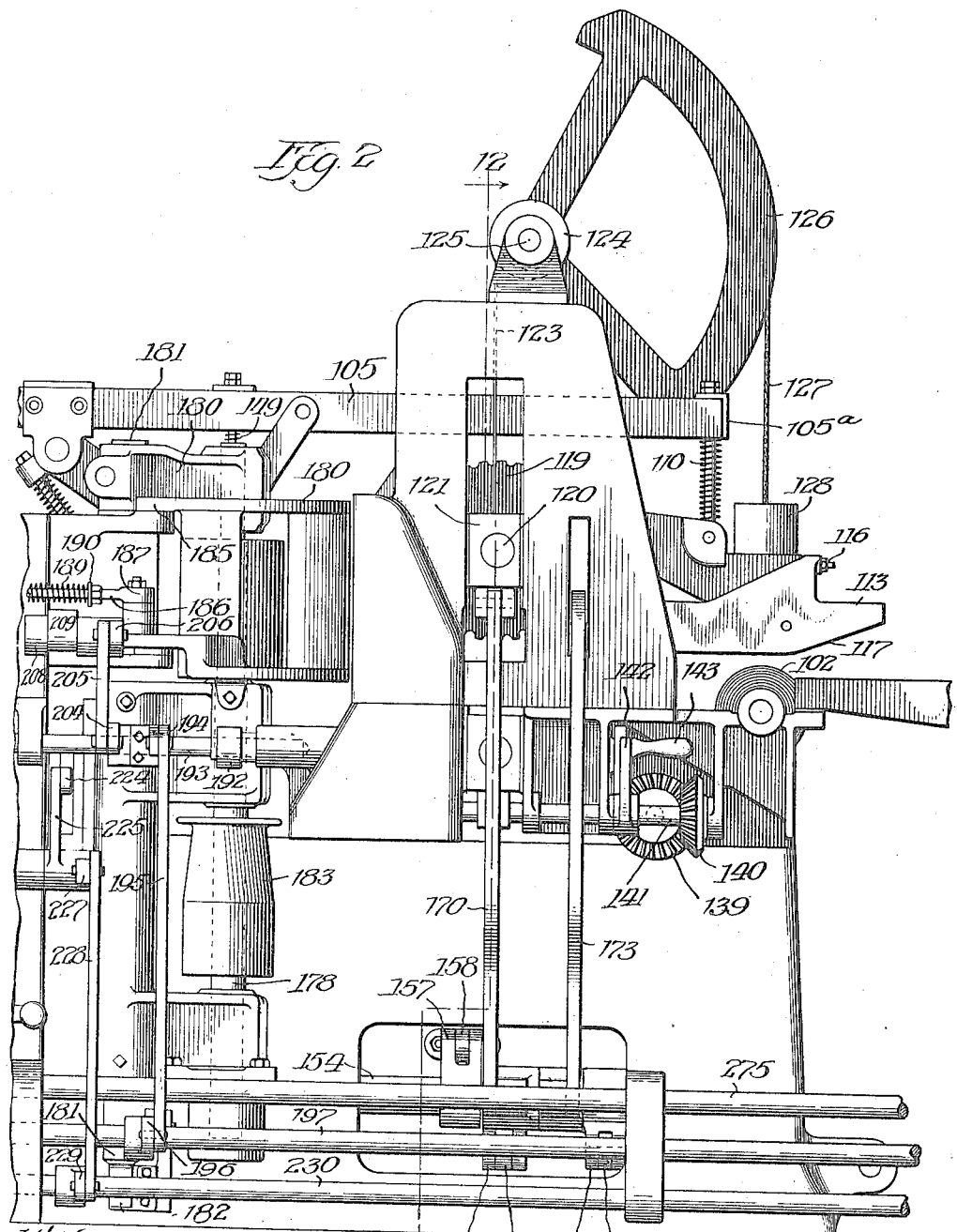

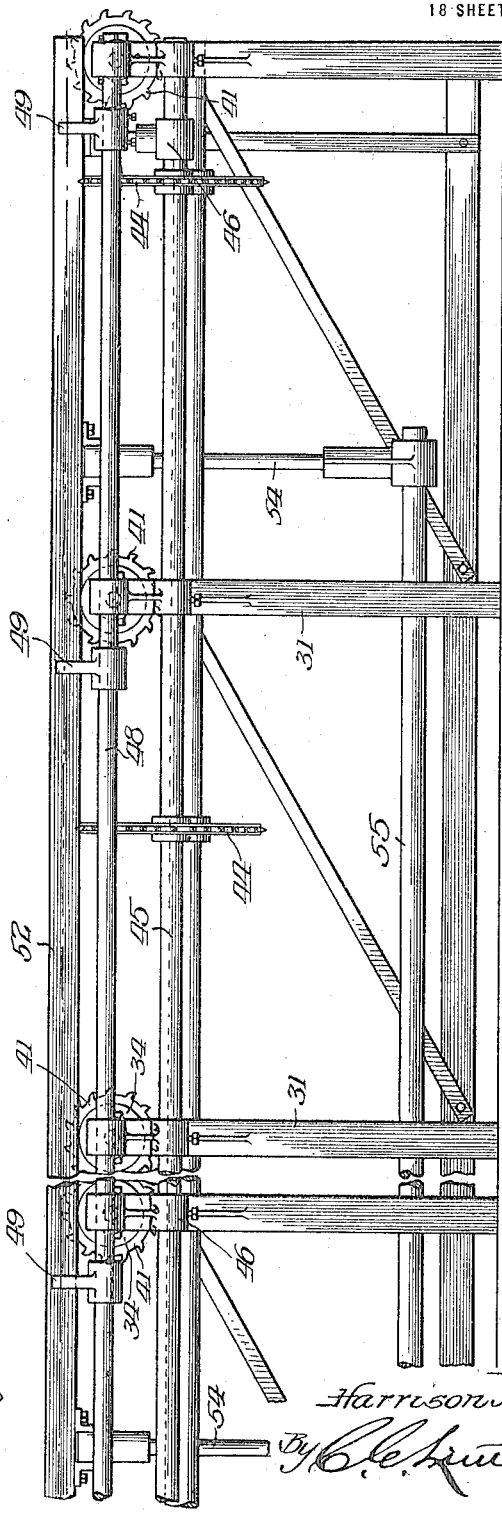

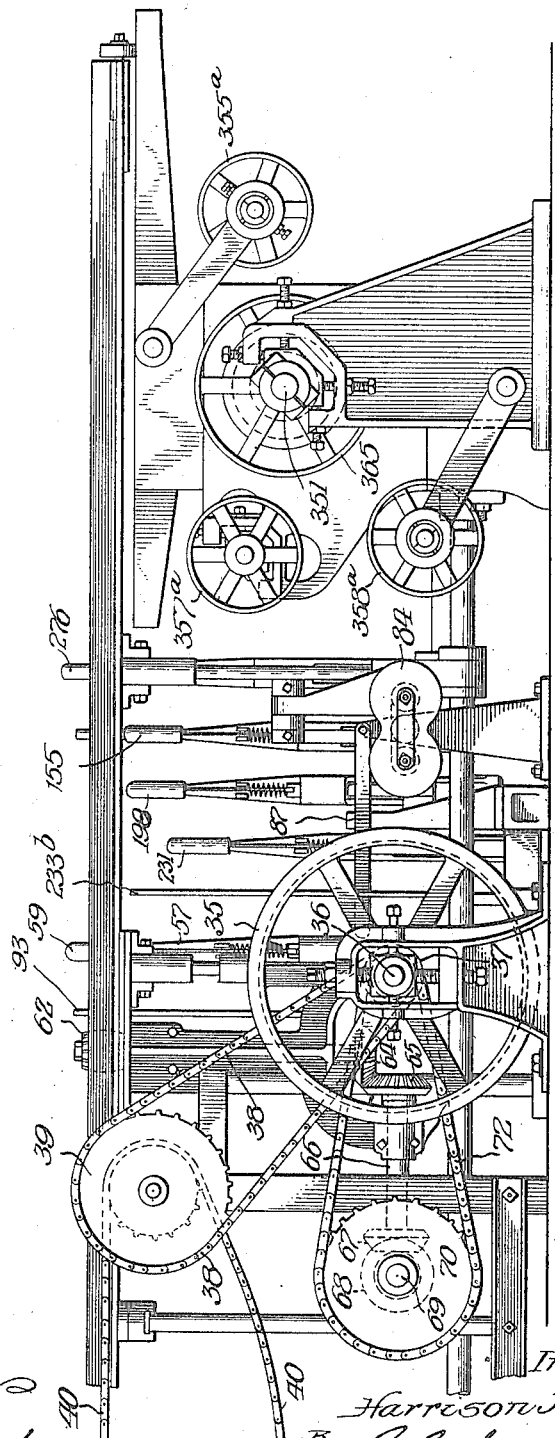

H. J. MITCHELL.
BOARD SIZING MACHINE.
APPLICATION FILED JUNE 25, 1915.
1,207,976.
Patented Dec. 12, 1916.
18 SHEETS—SHEET 6.
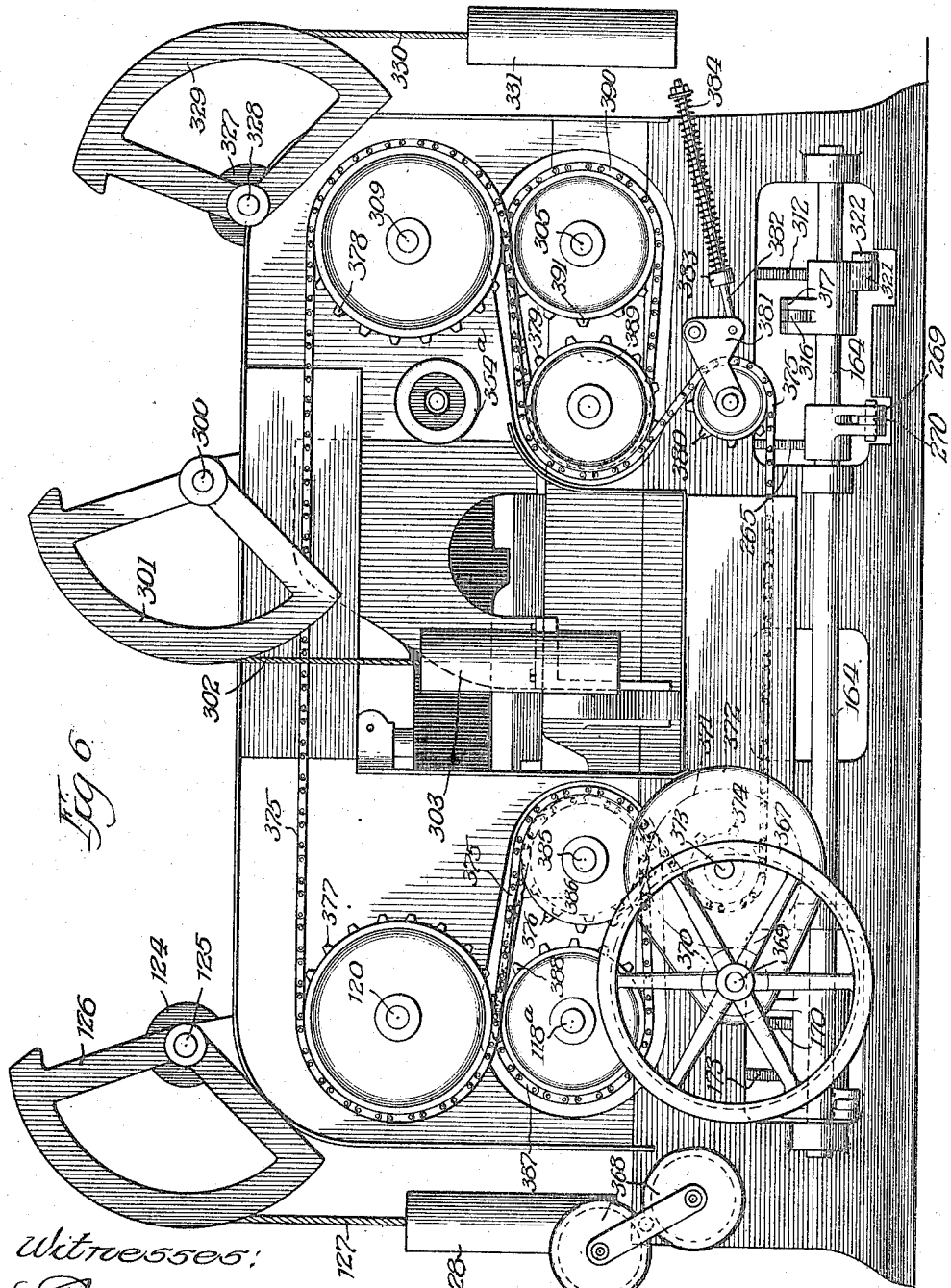
Witnesses:
Inventor
Harrison J. Mitchell
By C. L. Linthicum
Atty.

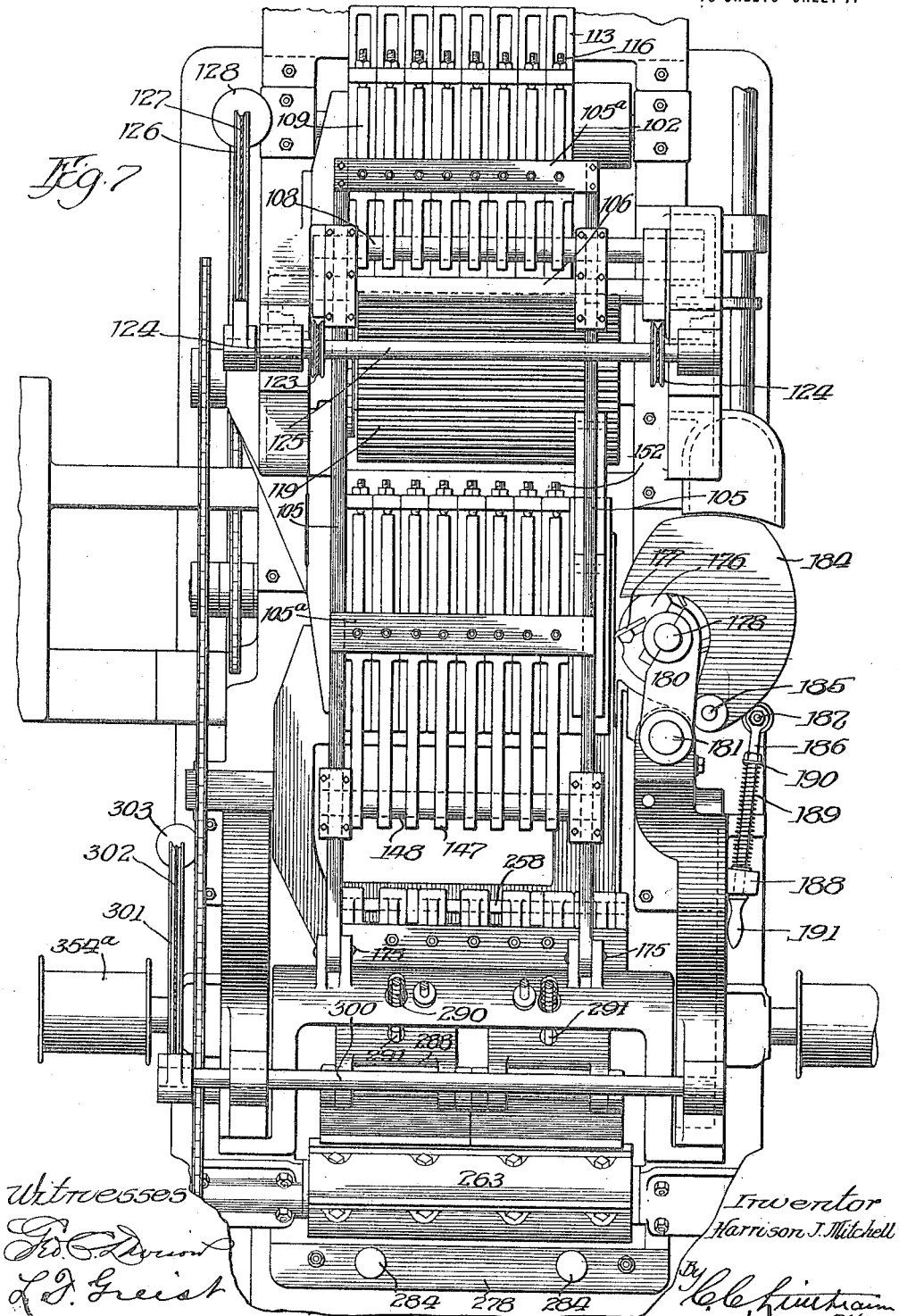

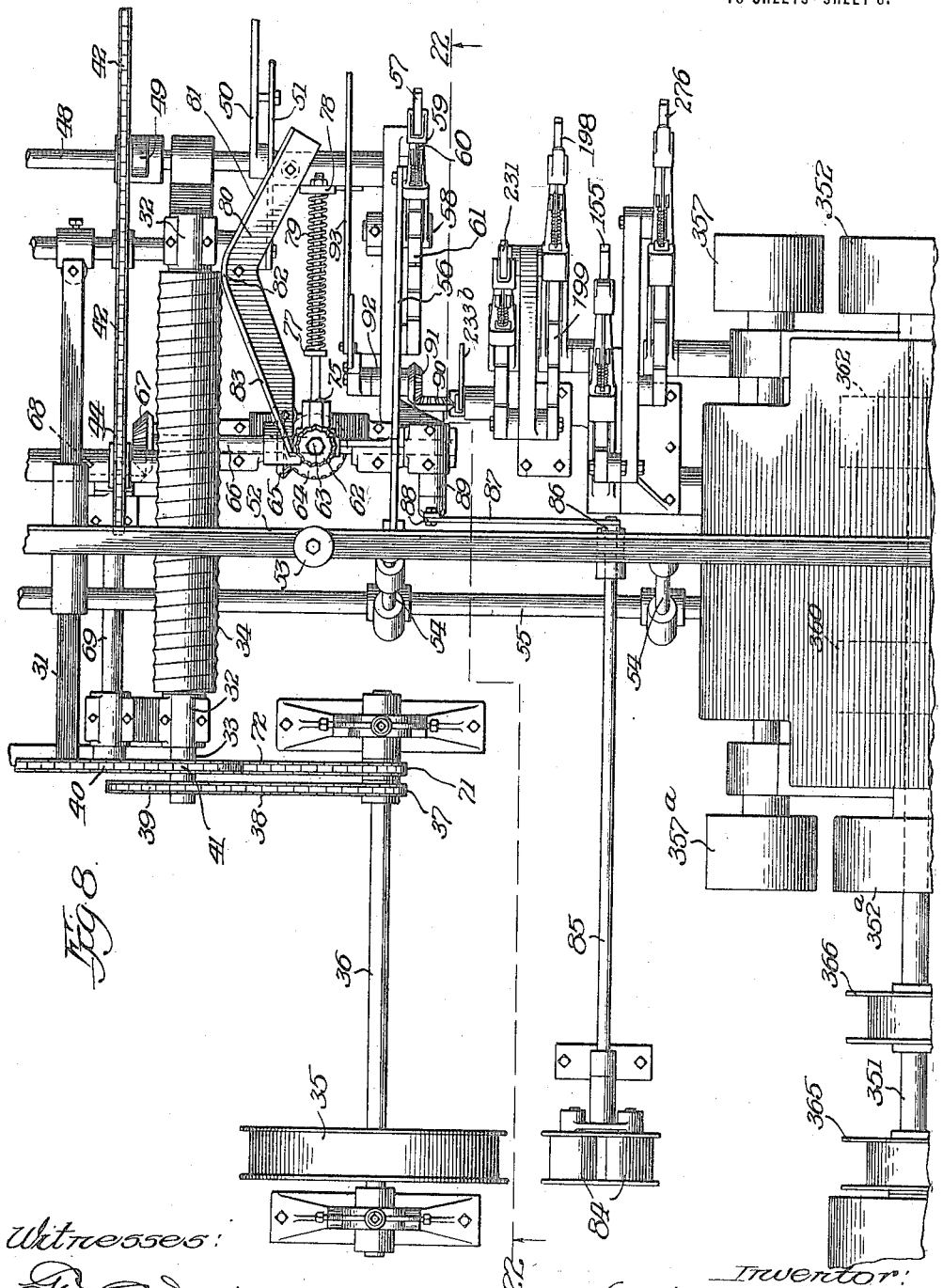

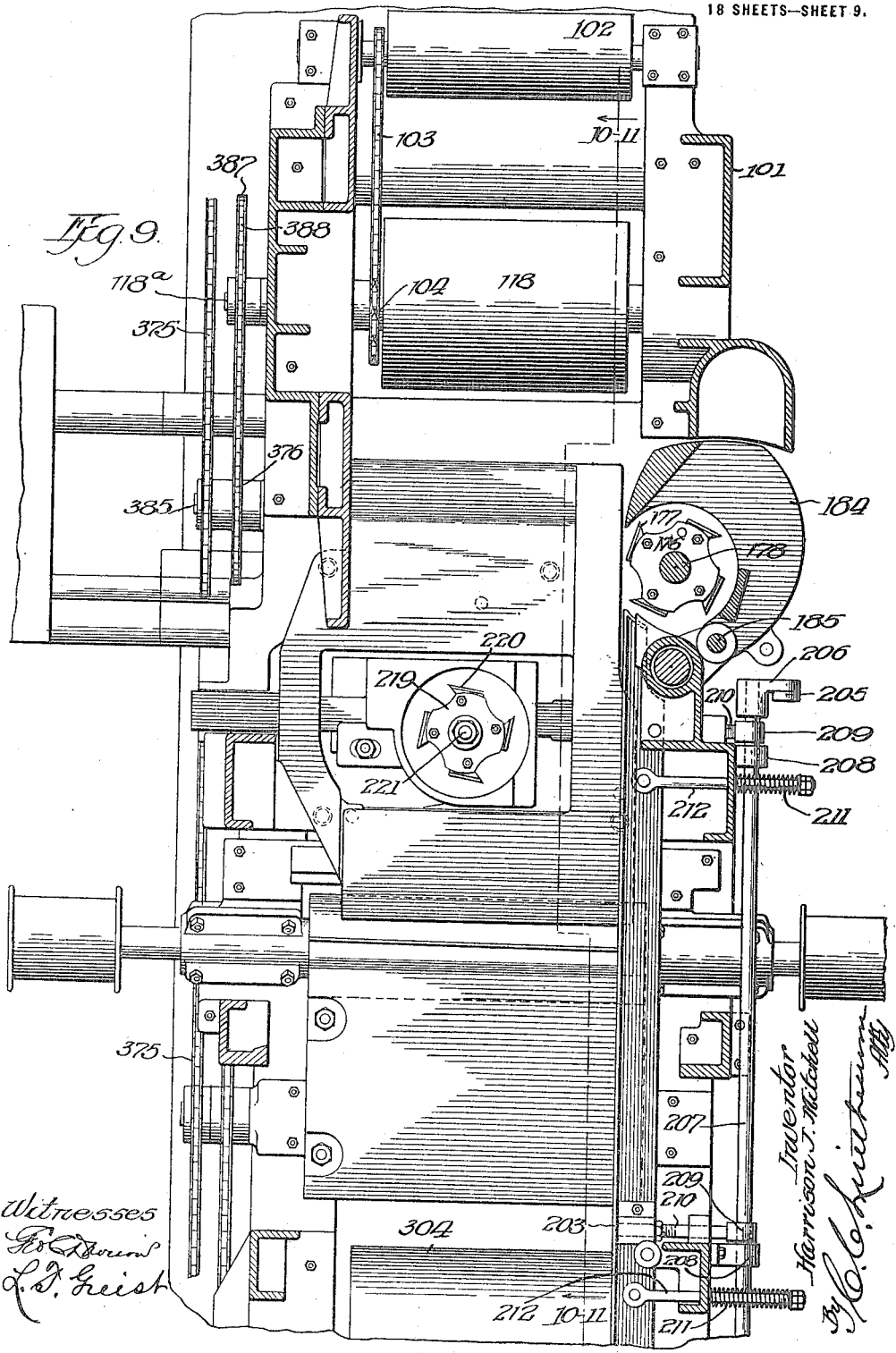

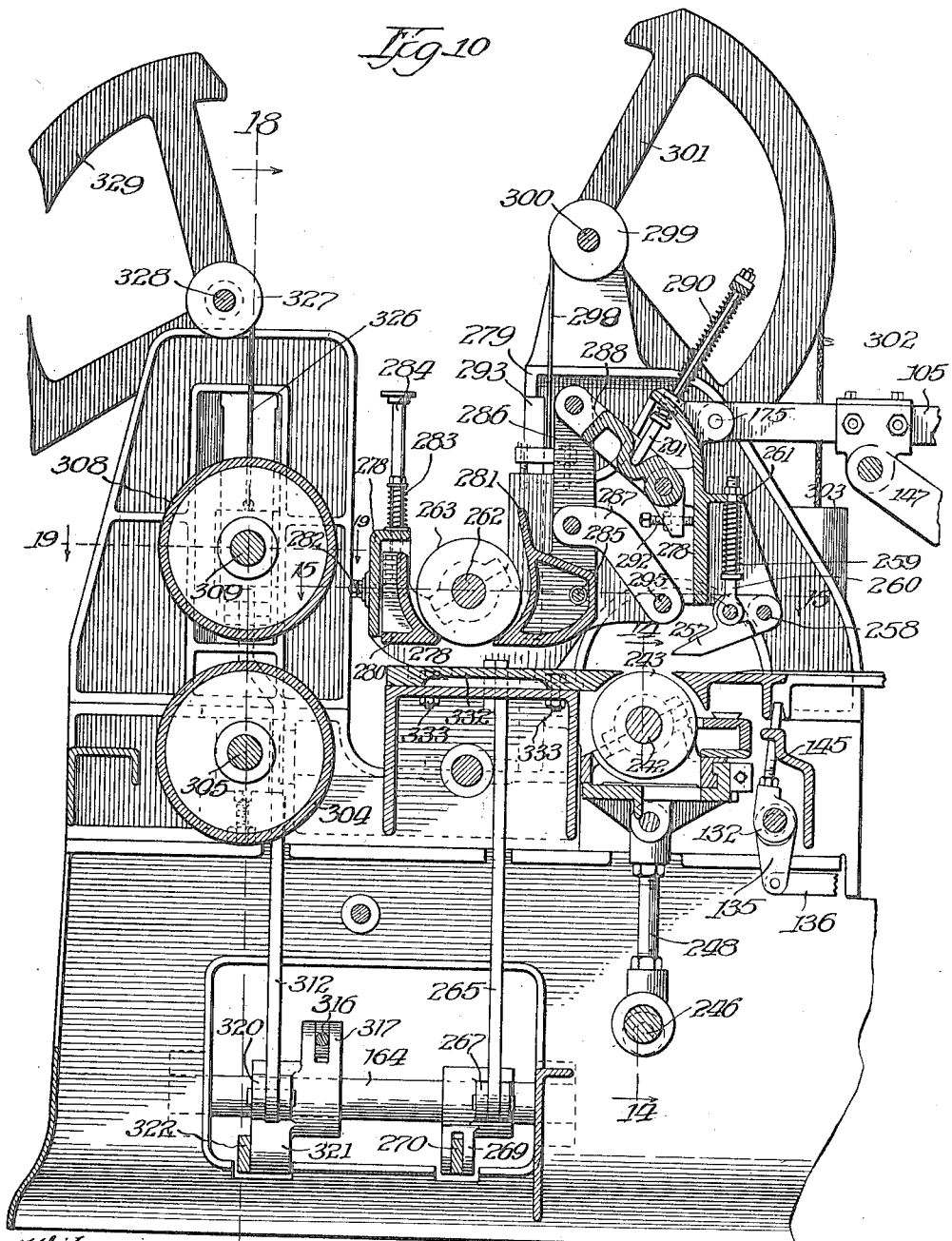

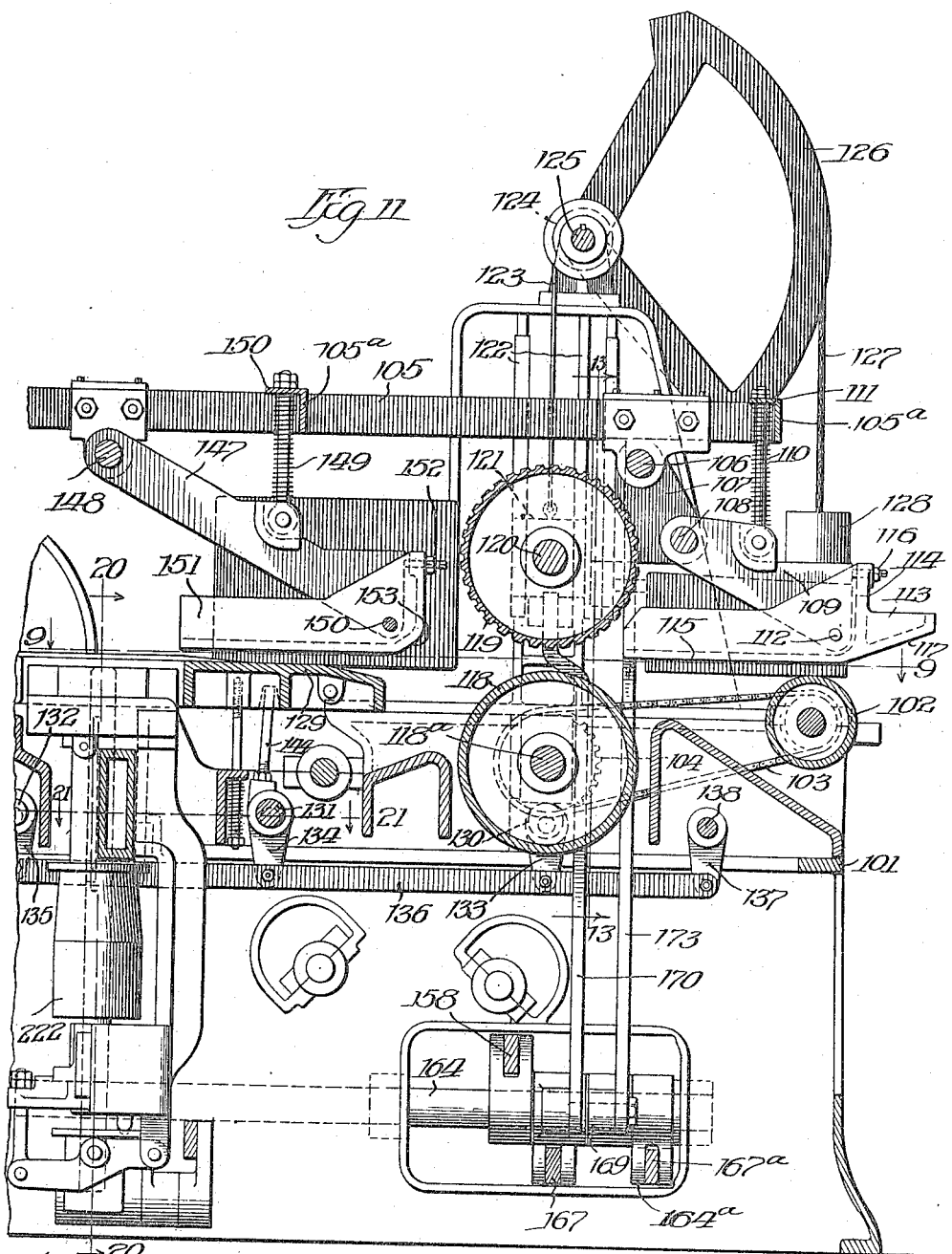

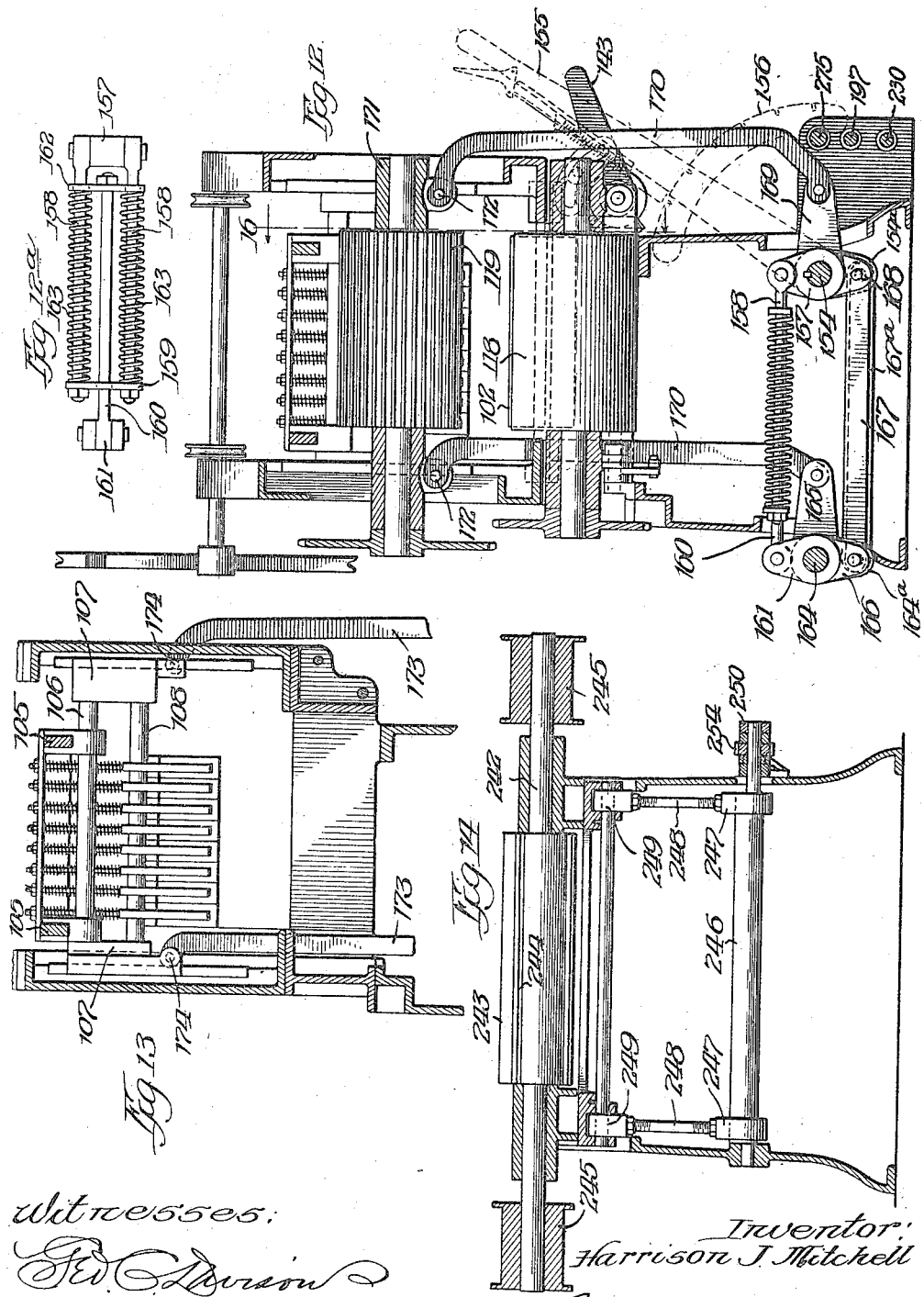

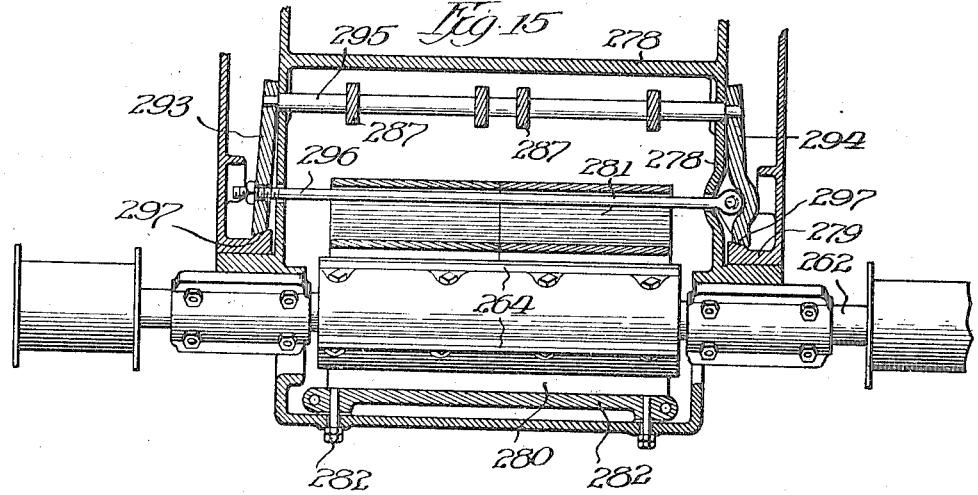
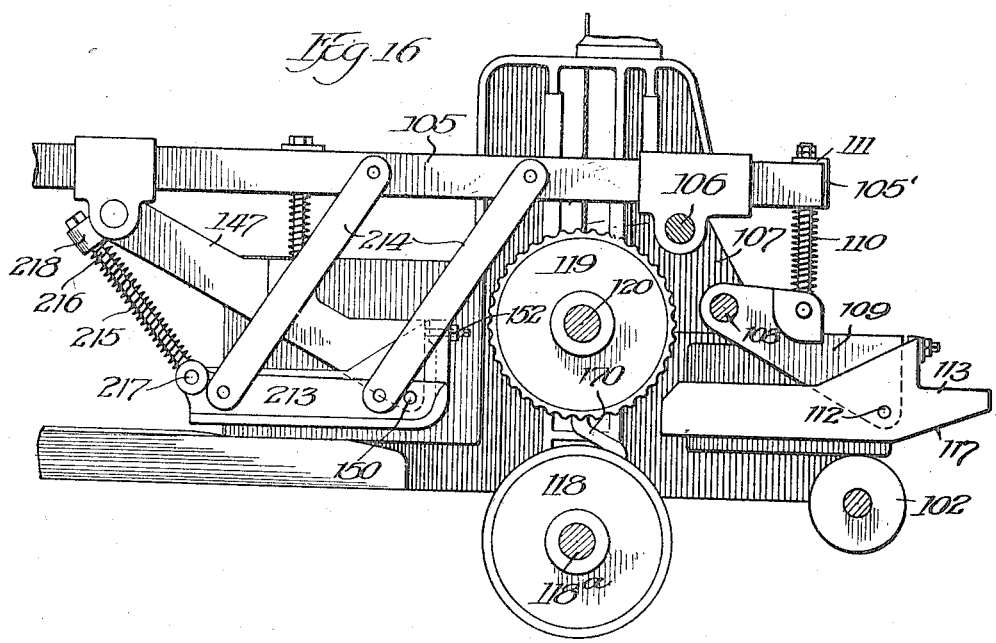

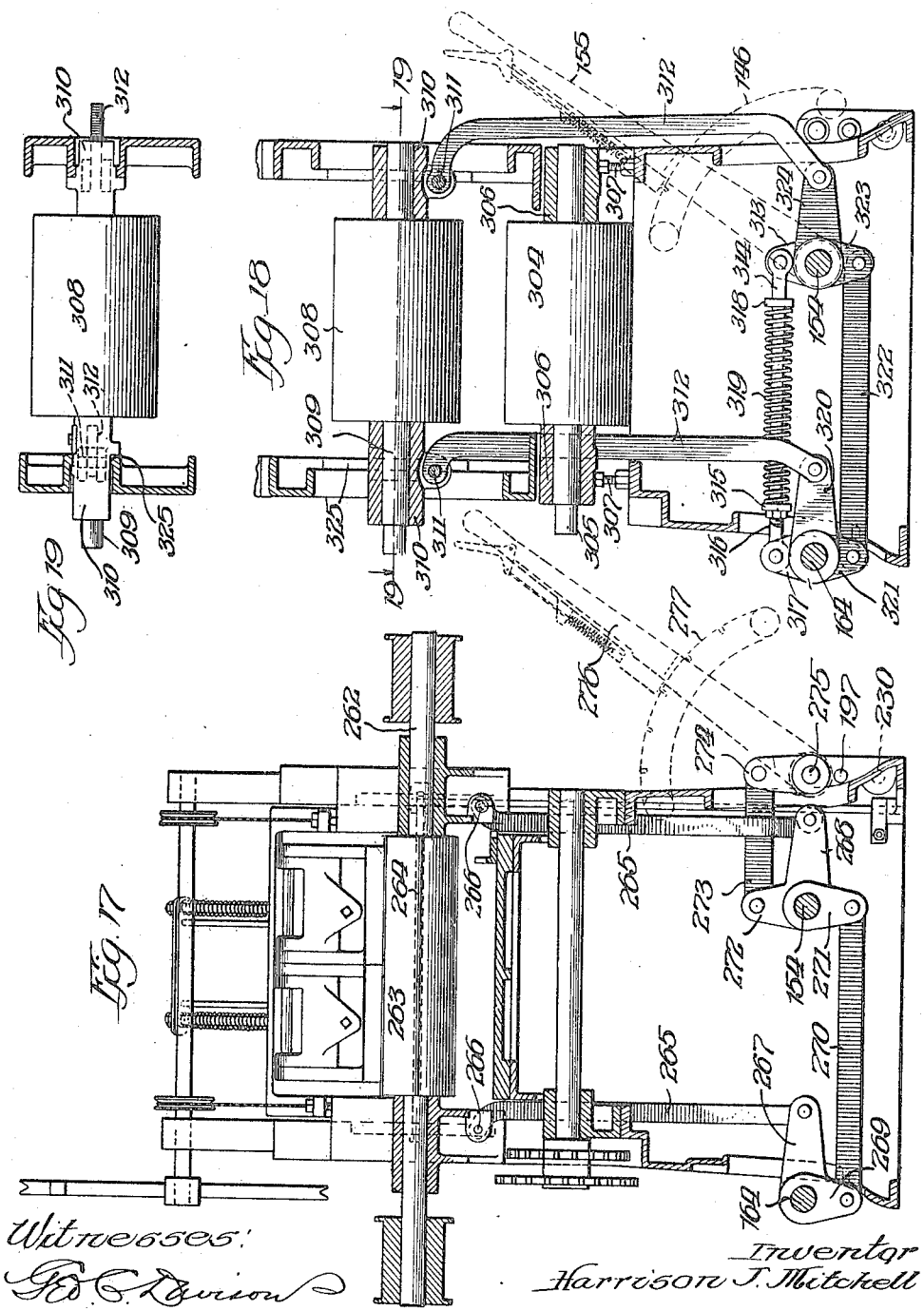

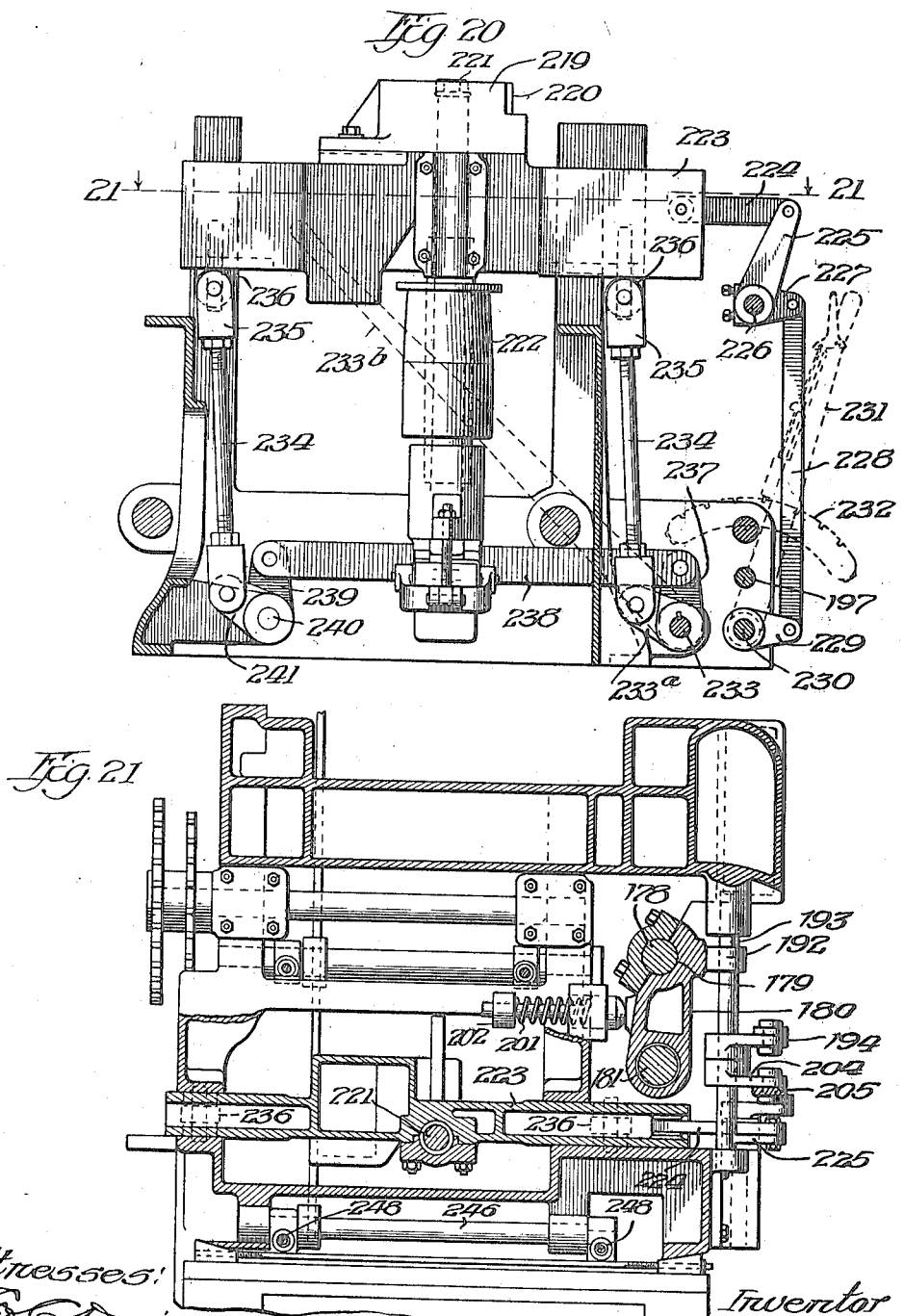

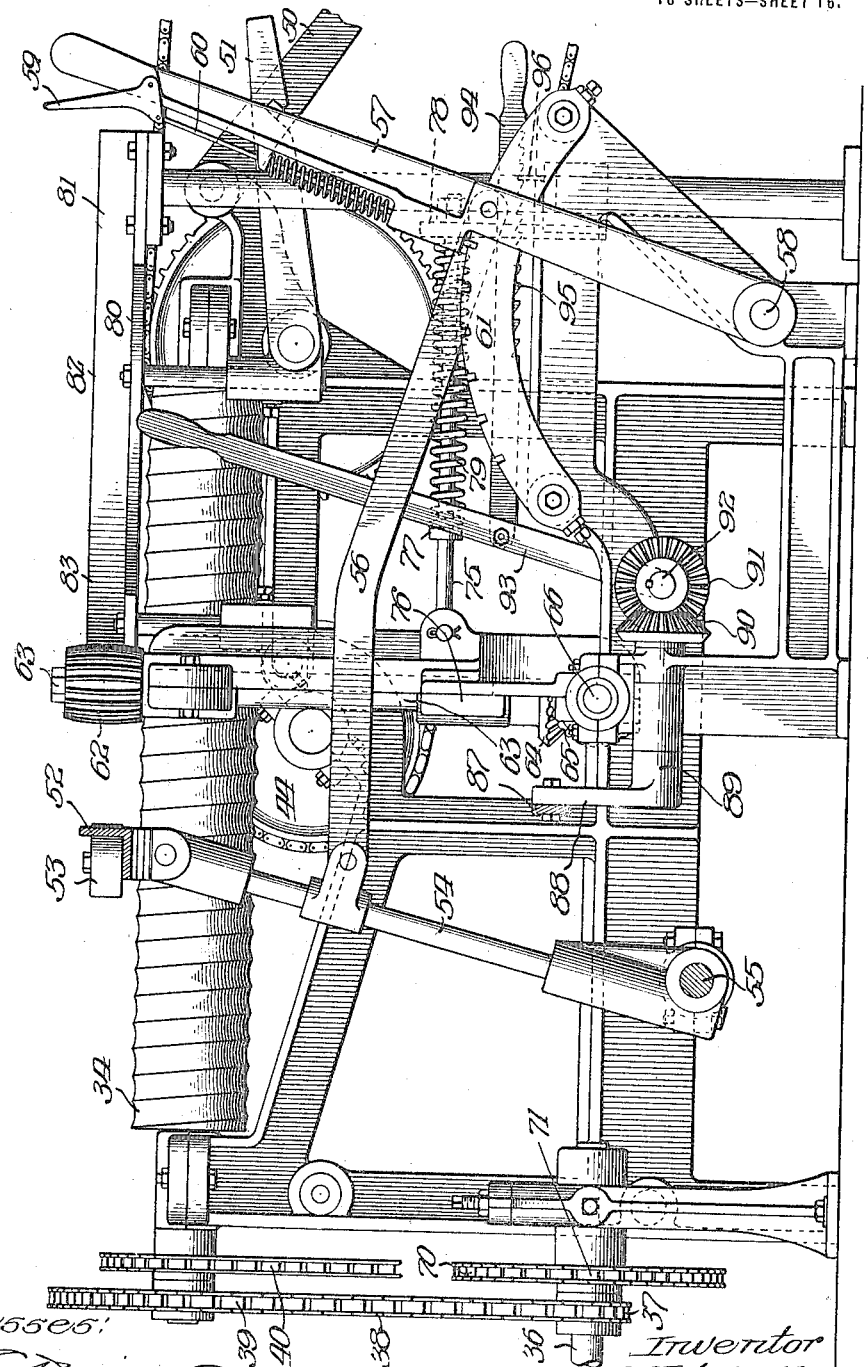

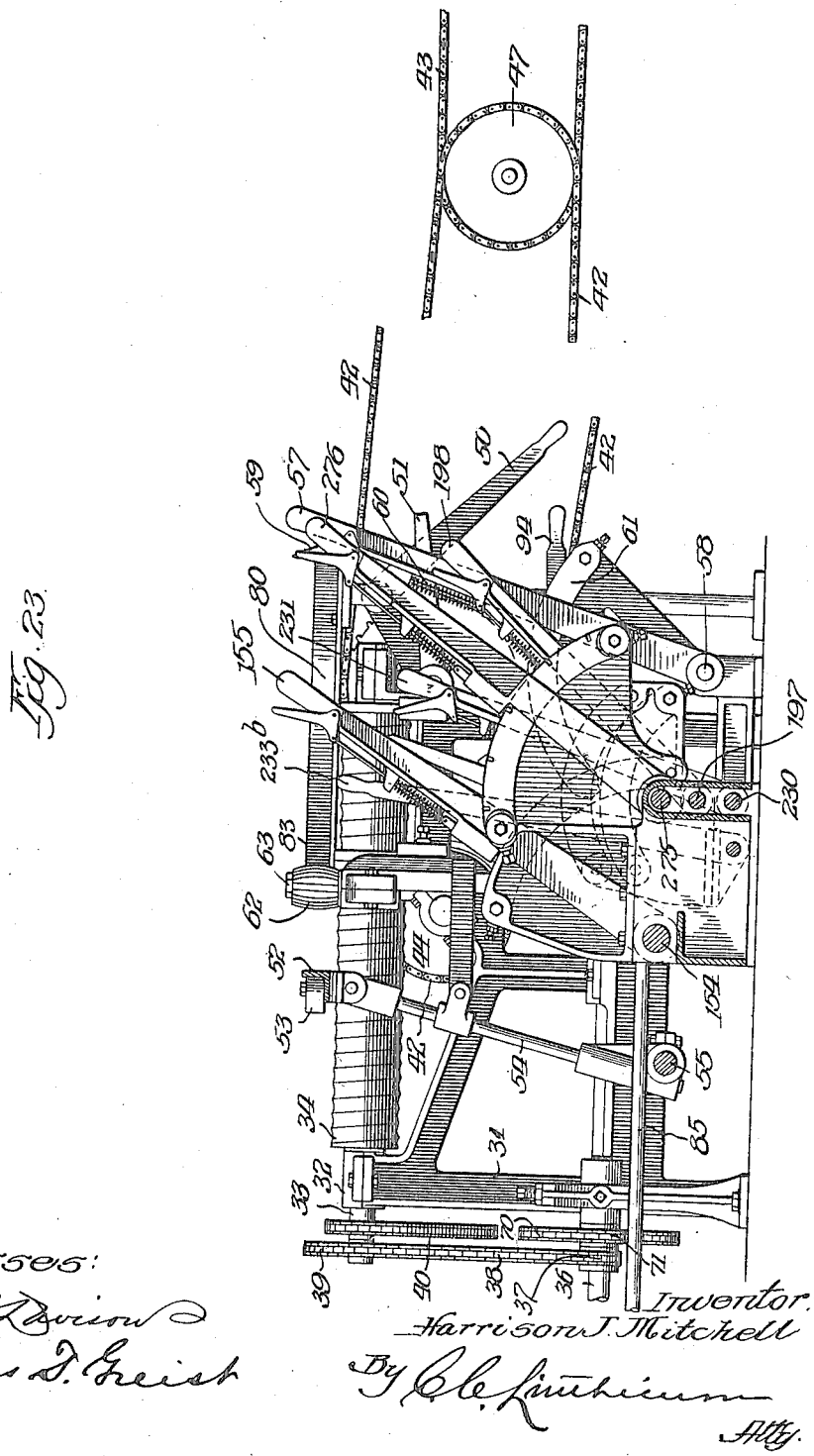

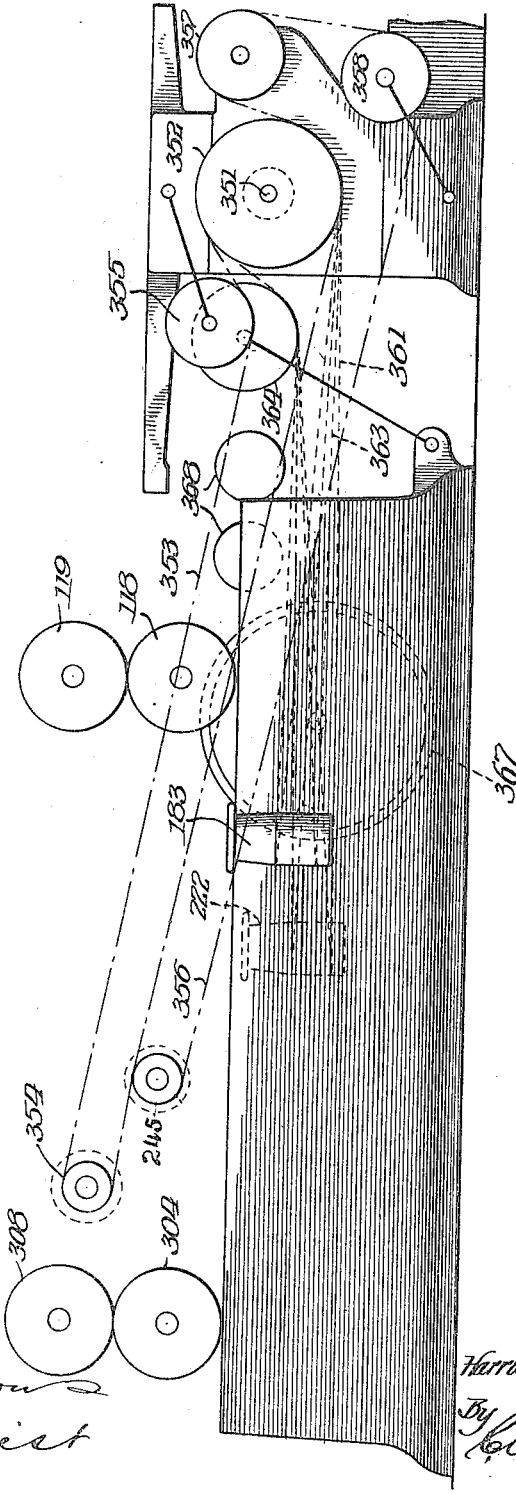

UNITED STATES PATENT OFFICE.

HARRISON J. MITCHELL, OF BELOIT, WISCONSIN, ASSIGNOR TO P. B. YATES MACHINE COMPANY, OF BELOIT, WISCONSIN, A CORPORATION OF WISCONSIN.

BOARD-SIZING MACHINE.

1,207,976.  Specification of Letters Patent.  Patented Dec. 12, 1916.

Application filed June 25, 1915. Serial No. 36,167.

*To all whom it may concern:*

Be it known that I, HARRISON J. MITCHELL, a citizen of the United States, residing at Beloit, in the county of Rock and State of Wisconsin, have invented certain new and useful Improvements in Board-Sizing Machines, of which the following is a specification.

The invention has for its object the provision of mechanical means, acting as nearly as practicable in an automatic manner and under the ready control of a single operator, to reduce the lumber, as it comes from the mill varying in dimensions and with a rough uneven surface, to boards of chosen dimensions and surface finished in such manner as to be adapted without further treatment for use under commercial conditions as to finish and size.

Among the features of construction characterizing an embodiment of the invention are improved means for feeding the stock to the machine and introducing the same to the operating mechanism; the automatically operating stock-guiding gages whereby different widths of stock are properly presented to the sizing and surfacing tools; the control from one point of the various tools acting upon the four surfaces of the stock to adapt the same to material of different widths and produce a desired shaping as tongue and groove, ship-lap, hollow back flooring, beading, etc., and to bring any one or more of the tools into and out of operation at will; improvements in construction and mounting of the working parts whereby to effect compactness, elasticity and adjustment, and capacity for performing superior work; also other improved features of construction and operation which will hereinafter be made apparent.

In order that the invention and the manner of its operation may be readily understood a preferred embodiment of the same is set forth in the accompanying drawings and in the description predicated thereon. As, however, the invention is susceptible of embodiment in other and varied constructional forms the drawings and description are to be taken in an illustrative and not in an unnecessarily limiting sense.

In the drawings, Figures 1 to 4 together represent the machine in side elevation; Figs. 5 and 6 together illustrate a partial side elevation from the opposite side; Figs. 7 and 8 together illustrate a partial top plan view; Fig. 9 is a horizontal section on the line 9—9 of Fig. 11; Figs. 10 and 11 together represent a vertical longitudinal section on the line 10—11 of Fig. 9; Fig. 12 is a vertical section on the line 12—12 of Fig. 2; Fig. 12ª is a detail top plan view of the yielding connection between certain parts; Fig. 13 is a vertical section on the line 13—13 of Fig. 11; Fig. 14 is a similar section on the line 14—14 of Fig. 10; Fig. 15 is a horizontal section on the line 15—15 of Fig. 10; Fig. 16 is a detail view illustrating the mounting of the gages; Fig. 17 is a vertical section on the line 17—17 of Fig. 1; Fig. 18 is a similar section on the line 18—18 of Fig. 10; Fig. 19 is a horizontal section on the line 19—19 of Fig. 10; Fig. 20 is a vertical section on the line 20—20 of Fig. 11; Fig. 21 is a horizontal section on the line 21—21 of Figs. 11 and 20; Fig. 22 is a vertical section on the line 22—22 of Figs. 3 and 8; Fig. 23 is a vertical section on the line 23—23 of Fig. 3; and Fig. 24 is a diagrammatic view illustrating the power transmission.

Referring particularly to Figs. 3, 4, 5, 8, 22 and 23, it will be observed that the supply of stock to the machine is by way of a feed table comprising frame members 31 suitably braced and providing journal boxes 32 for the shafts 33 of helically grooved rollers 34 arranged transversely of the table in a longitudinal series, these rollers being driven from the pulley 35 on the shaft 36 by means of the sprocket 37, chain 38, the sprocket 39 and the chain 40, traversing the sprocket wheels 41 on the end of the shafts 33, the direction of rotation of the helically grooved rollers 34 is such that the grooves and ribs on the upper sides of the rollers will progress from the front of the machine, as seen in Fig. 4, to the rear, or from the right of the machine as seen in Figs. 8, 23 and 22 to the left.

The material is supplied to the upper surface of the rollers upon the feed table by means of the carrier chains 42—43 traversing sprockets 44 on the shaft 45 journaled at 46 in the frame of the table and also traversing the relay pulleys 47, the chains 43 leading from sprockets, not shown, driven by any suitable source of power at the mill or point of lumber storage. The stock material in the form of rough boards or the like is laid transversely on the sprocket chains 43 and is by the chains 43 delivered to the chains 42 which transport the pieces to and deliver the same onto the upper face of the grooved rollers 34.

Suitably mounted on the side of the feed table immediately below the sprocket chains 42 is a rock shaft 48 provided at intervals with laterally extending arms 49. The shaft is adapted to be rocked by means of the lever 50 so as to turn the arms 49 upward and interpose the same in the path of the material being transported upon the chains 42 and thereby interrupt its delivery to the top of the feed table. The lever 50 is normally locked by means of the latch 51 so as to prevent accidental interposition of the arms 49 in the path of the material.

Extending longitudinally of the feed table above the grooved rollers 34 is a back guide 52 recessed at intervals for the accommodating of anti-friction guide rollers 53, said guide being carried by rock arms 54 mounted on the rock shaft 55, said arms connected by a link 56 with a lever 57 fulcrumed at 58 and having a finger piece 59 connected with a spring pressed plunger rod 60 for engagement with the teeth of a sector 61. By the manipulation of the lever 57 the guide 52 may be adjusted laterally of the table in a position to guide stock of different widths from the feed table into the machine after it is delivered against said guide by the progressive feeding movement due to the rotation of the grooved rollers 34.

In order to feed the material longitudinally of the table along the guide 52 the spur wheel 62 is provided, said spur wheel being slightly convex and fixed upon a shaft 63 driven by means of the bevel gear 64 from its companion gear 65 on the shaft 66 connected by means of the bevel gear 67, 68, with the shaft 69 of the sprocket 70 which is driven from the sprocket 71 on the shaft 36 by means of the sprocket chain 72. The shaft 63 of the spur wheel 62 is journaled in a bracket 73 which is mounted to rock at 74 about the shaft 66. A rod 75 is connected to the boxing of the shaft 63 at 76 and is provided with a collar 77 between which and the upstanding bracket 78 of the frame is mounted a spring 79 which presses the shaft 63 and the spur wheel 62 yieldingly to the left as seen in Figs. 8, 22 and 23 against the material lying between said spur wheel 62 and the back guide 52, the direction of rotation of the spur wheel 62 being such as to feed the stock longitudinally of the table into the machine.

In order to further facilitate the proper positioning of the stock upon the feed table as it is delivered thereto by the carrier chains 42 and to even the ends of the material upon the table a deflector 80 is mounted, as shown in Fig. 8, the inclined face 81 of which will cause all of the material to move to the rear until it passes the high point of said deflector at 82, thereafter permitting the material to advance along the inclined face 83 as it approaches the back guide 52.

The transmission of power to and the driving of the grooved rollers 34 and the feed spur wheel 62 is controlled by the tensioning or loosening of the belt to the pulley 35 by means of the belt tightener 84 upon the shaft 85 which has an upstanding arm 86 connected by means of the link 87 with the arm 88 of a rock shaft 89 connected by means of the gears 90, 91 with the shaft 92 to which is fixed the lever 93. Provision is made for holding the belt tightener in adjusted position by means of a latch 94, the teeth 95 of which are adapted to engage an edge of the machine frame at 96.

The machine proper comprises a massive frame 101 connected with or disposed immediately adjacent the end of the feed table above described. Having reference particularly to Figs. 7, 11, 12, 13 and 16 it will be observed that at that end of the machine adjacent the feed table is mounted a stock receiving roll 102 driven by means of a chain 103 from a sprocket 104. Immediately above the receiving roll 102 is arranged a sectional gage made up of a plurality of members arranged in a series transversely of the machine. This sectional gage is so constructed that a sufficient number of individual members thereof will yield before the advancing stock to permit the remaining members to serve as an abutment gage or lateral support, the number of gage members yielding out of the way being dependent upon the width of the material entering the machine.

By reference to Fig. 11 it will be observed that there is a frame composed of longitudinal supporting bars 105 connected by cross members 105$^a$, between which bars at the forward end thereof extends shafts 106 having their ends engaging in guiding blocks 107 and on these blocks at 108 are pivotally mounted gage members 109 spring pressed downwardly by means of springs 110 bearing upwardly against the shoulders 111 while at the lower forward ends of the members 109 are pivoted, as indicated at 112, gage shoes 113, each of the shoes having a flanged end 114 and a flanged bottom 115, the flanged end being held in adjusted position to the member 109 by means of a set screw 116. The forward bottom portion of the gage shoe 113 is beveled at 117 to present an oblique forward face adapted to ride up the end of an approaching board on to the top surface thereof, the shoe 113 and gage member 109 yielding against the tension of the spring 110. The side face of the shoe toward the observer in Fig. 11 is perfectly smooth. It will be readily understood that those shoes engaged by the front end of the board will yield and ride upon the top of the board while the next adjacent shoe not engaged by the board will form a side gage or abutment against which the edge of the board will bear as it passes into the machine over the receiving roll 102. As there are a large number of these gage sections they automatically accommodate themselves to boards of different widths, the number of the gage sections or shoes riding upon the surface of the board corresponding to the width of the board and the remaining gage sections or shoes acting as a lateral support for the board.

Immediately to the rear of the sectional gages is arranged a pair of in-rolls comprising a smooth surface roll 118 and a ribbed surface roll 119, between which the board is adapted to be received and fed toward the rear to the first tool. The upper in-roll 119 is mounted upon a shaft 120 in a boxing 121 slidably mounted within guides 122 the said boxes being suspended by means of cords 123 extending around pulleys 124 on the shaft 125 to which is fixedly secured a sector sheave 126 upon the surface of which lies a cord 127 supporting a counterweight 128 by means of which the weight of the upper in-roll 119 is so far compensated as to facilitate the vertical adjustment of said roll.

The lower in-roll 118 mounted on the shaft 118$^a$ is normally fixed as to height but it is vertically adjustable together with the bed of the machine lying immediately to the rear thereof and indicated at 129 by means of the eccentrics 130, 131, 132 from the shafts of which eccentrics arms 133, 134, 135 extend and are connected by means of a rod 136, the end of which is in turn connected to an arm 137 on the shaft 138, provided with a beveled gear 139 in mesh with a similar gear 140 on a shaft 141 provided with a crank arm 142 having a handle 143. The lower in-roll and the bed of the machine is adjusted vertically by actuating the handle 143 whereby the pinions 140 and 139 (Fig. 2) rock the shaft 138 with its arm 137 and thus angularly adjust in unison each of the cams 130, 131, 132 by means of their arms 133, 134 and 135. The eccentric 130 acts directly upon the journal boxing of the in-roll 118 while the movement of the eccentrics 131 and 132 is transmitted to the machine bed 129 by means of the thrust rods 144 and 145.

Immediately above the bed of the machine as indicated at 129, is arranged a second transversely extending series of sectional gages quite similar in construction and operation to the set previously described as located above the receiving roll. In this case, however, the gage members 147 are pivoted directly to the cross shaft 148 being yieldingly supported by the springs 149 bearing upwardly against the shoulder 150 and having pivoted to the lower end of the gage member 147 at 150 the gage shoe 151 likewise held by the set screw 152 so as to permit of a slight upward yielding of the heel of the shoe as in the former case, the shoe 151 being also provided with an oblique front face at 153.

The vertical adjustment of the upper in-rolls 119 and of the sectional guides is accomplished in the manner following, having reference to Figs. 2, 11, 12, 13, and 16: A rock shaft 154 extends longitudinally of the machine and is adapted to be rocked by means of the lever 155 at the front of the machine adjacent the feed table, the position of said lever being determined by the notched sector 156. This shaft has keyed thereon an upwardly extending bifurcated arm 157 (Figs. 12 and 12$^a$) connected by means of a rod 158 with a cross head 159, which latter is guided upon rods 160, 160, secured at one end to the arm 161 and at the other end connected by a cross head 162 guided upon the rod 158. Springs 163 are mounted upon the rods 160 between the cross heads 159 and 162 whereby the connection between the arms 157 and 161 is constituted a yielding one. At the rear of the machine a rocking shaft 164 extends parallel to the shaft 154 and upon this shaft is loosely mounted the arm 161 which forms one member of a T-lever having an arm 165 extending horizontally and an arm 166 extending vertically downward. The arm 166 is connected by means of the link 167 with an arm 168 mounted loosely upon the shaft 154 and having an integral horizontally extending arm 169. The arms 165 and 169 are both connected by means of lift rods 170, 170, to the journal box 171 of the upper in-roll 119 at 172, 172. It will be observed that if the lever 155 is moved to the left, as shown in Fig. 12, the shaft 154 will be rocked and the arms 157 and 161 moved to the left thus lifting one of the rods 170 by means of the arm 165 and the companion rod 170 by means of the link 167 and the arm 169, the reverse movement of the lever 155 will lower the upper in-roll 119. The springs 163 interposed in the connection between the arms 157 and 161 provide for yielding support of the in-roll 119 so that the same may yield slightly without any resulting movement of the shaft 154 or the lever 155.

Keyed upon the shafts 154 and 164 adjacent the arms 165 and 169 are arms 154$^a$ and 164$^a$ cross-connected by a link 167$^a$ whereby the two shafts will be rocked in unison by the lever 155. Also keyed to the shafts 154 and 164 are arms 165$^a$ and 169$^a$ having attached thereto a pair of companion lift rods 173 which extend upwardly to a connection at 174, 174 with the guide blocks 107 of the sectional guides. It follows that upon the raising or lowering of the in-roll 119 to accommodate stock material of different thicknesses the forward ends of the longitudinal supporting bars 105 will be likewise raised or lowered to adjust the height of the sectional gage. The rear ends of the bars 105 are pivotally attached at 175 to a portion of the machine frame which is likewise vertically adjustable as will be hereafter described, the pivotal connection of the bars at 175 as also the pivotal mounting of the bars at their forward ends upon the guide blocks 107 permitting the adjustment of the forward ends of the bars independently of the rear ends when desired.

Immediately to the rear of the in-rolls and substantially in transverse alinement with the sectional gages carrying the shoes 151 is mounted the outside cutter head, that is to say, the tool for dressing the outer face of the material as it passes through the machine. This particular feature of the machine will be best understood from Figs. 2, 7, 9 and 21 of the drawings. The particular construction of the head forms no part of the present invention and consists generally in the rotary head 176 carrying cutting tools 177 and arranged to rotate in a horizontal plane upon the vertical shaft 178 said shaft having its bearing at 179 in a bracket 180 mounted on a vertical pivot or pintle 181, said pivot and bracket mounted for vertical movement with the lower end of the pivot resting upon the cam 182 on the shaft 233 whereby upon the rocking of the shaft 233 the vertical adjustment of the cutters 177 relative to the work will be varied. The shaft 178 of the outside cutter head is driven by the pulley 183 in a manner to be hereafter described. The cutter head is inclosed within a housing 184 pivoted at 185 on the bracket 180, the pivotal mounting of the housing being for the purpose of giving access to the cutter head when desired. The housing is normally yieldingly held in its closed position by means of the latch rod 186 pivoted to the housing at 187 and engaging within a keeper 188, the rod is provided with a spring 189 which bears at one end upon the collar 190 and at the other upon the keeper 188. By means of the handle 191 the latch rod may be swung clear of the keeper 188 thus permitting the housing to swing outwardly upon its pivot 185.

The tools 177 of the outside head are held to their work by means of the cam 192 on the shaft 193, said shaft having a laterally extending arm 194 connected by means of a link rod 195 with an arm 196 fast upon the rock shaft 197 to which is rigidly secured a lever 198 engaging a notched sector 199. The head is pressed outwardly against the cam 192 by means of a plunger 200 mounted within the machine frame under the control of the compression spring 201 acting upon the guide abutment 202 (Fig. 21).

Extending rearwardly from the outside head and longitudinally in line with the work surface of the cutters is a front guide 203 along which the material is guided after leaving the outside cutter with its outer face finished. It is necessary that the position of this guide be adjusted laterally in unison with the lateral adjustment of the outside cutter head and for this purpose the shaft 193 bearing the cam 192 is provided with another arm 204 connected by means of a link 205 with an arm 206 extending from the rock shaft 207 mounted in bearings 208, 208 and carrying cams 209, 209 acting upon adjustable studs 210, 210, projecting from the guide 203. The guide is pressed outwardly and maintained in contact with the cams 209 by means of the springs 211, 211 mounted upon the rods 212, 212 connected to the guide as shown (Fig. 9).

On the front supporting bar 105 between the operative face of the cutter head 176 and the first gage shoe 151 is mounted a hold down shoe 213 by means of parallel links 214, 214 the heel of the shoe being yieldingly supported against rearward or upward movement by means of the spring 215 upon the rod 216 which is pivotally connected to the shoe at 217 and slidable within a guide 218. The function of this shoe is to ride upon and press down the lumber while being acted upon by the cutting tools and laterally supported by the sectional gages, the parallel links 214 permitting of the necessary vertical play of the shoe without disturbing the horizontal relation of its lower face.

Next adjacent the outside cutter head to the rear thereof is the inside cutter head 219 (Figs. 9, 20 and 21) bearing the cutting tools 220 and mounted upon the vertically arranged shaft 221 carrying the drive pulley 222. This cutter head is so disposed as to act upon the opposite face of the material from the outside cutter and provision must therefore be made for lateral displacement of the inside cutter head bodily to adapt the same for the finishing of material of different widths. For this purpose the cutter head and its shaft are mounted within a slidable cross head bearing frame 223 connected by means of the link 224 with the arm 225 of a rock shaft 226 from which extends another arm 227 connected by means of a link 228 with an arm 229 of the rock shaft 230. The shaft 230 is rocked by means of a lever 231 and is held in adjusted position by means of the engagement of the lever 231 with the notches of a sector 232.

Reference has heretofore been made to the vertical adjustment of the outside cutter head by means of its footstep bearing on the cam 182 on the shaft 233. Provision is likewise made for the vertical adjustment simultaneously therewith of the inside head 219 from the rock shaft 233. An arm 233ª keyed upon said shaft 233 (Fig. 20) carries a vertical lift rod 234 having upon its upper end a bearing block 235 with an anti-friction roller 236 supporting the lower face of the cross head 223. Another arm 237 keyed upon the shaft 233 is cross connected by means of the link 238 with an arm 239 of an angle lever fulcrumed at 240, the other arm 241 of said lever carrying a second lift rod 234 having a bearing block 235 and an anti-friction roll 236 supporting the opposite side of the cross head 223. It will be readily apparent that upon the rocking of the shaft 233 by means of the lever 233ᵇ both the outside and the inside heads will be vertically adjusted simultaneously to accord with the finish to be given the material.

The range of vertical adjustment of the two side heads is such as to enable the operator, in the one machine to plain dress the edges of the boards, or make ship lap of varying contour, or to drop the head entirely below the plane of the board and leave the edge unacted upon. The capacity of the inside head to drop below or disappear permits of the working in the machine of extra width material which can then overlie the depressed inside head.

Mounted to rotate in a vertical plane upon a horizontal axle 242 to the rear of the inside head with its operative face in substantially the horizontal plane of the machine bed is the lower cutter head 243 carrying cutting knives 244, the shaft of said cutter head being driven from pulleys 245, 245. The vertical adjustment of the cutter head 243 is provided for by means of an eccentric shaft 246 journaled in the sides of the frame and connected by means of eccentric straps 247, 247 and adjustable lift rods 248, 248 with the boxing of the shaft 242 at 249, 249. In order to adjust the angular position of the eccentric shaft 246 to raise and lower the cutter head 243 the end of the shaft 246 extends through the machine frame to a bearing in an adjusting plate 250 one end of the plate being pivoted on the frame and the other end having a slotted mounting upon the stud 252 and under the adjusting control of set screws 253, 253. The shaft 246 has fixed thereon a worm wheel 254 in mesh with a worm 255 carried by the arm 250ª and operable by means of the squared end 256. By the turning of the worm 255 the worm wheel on the shaft will be likewise turned and the shaft angularly adjusted so as to control the working height of the lower head. Moreover the lower head can be quickly dropped out of operation by grasping the arm 250ª by its handle 250ᵇ and swing the same upon the shaft 246 as a pivot whereby the engagement between the worm and wheel will turn the shaft temporarily without disturbing the more permanent adjustment thereof.

In operative relation to the bed of the machine and immediately adjacent the cutters of the lower head is arranged a hold down shoe 257 pivoted at 258 and held down by a spring 259 disposed upon the rod 260 and bearing upwardly against a shoulder 261 of an adjustable portion of the frame whereby the position of the hold down shoe will be automatically changed to conform to different thicknesses of material at the same time that other parts are adjusted for the purpose.

Mounted above and to the rear of the lower cutter head upon a horizontally disposed axle 262 (Figs. 1, 7, 10, 15 and 17) is an upper cutter head 263 rotating in a vertical plane and equipped with cutter knives 264 for finishing the upper face of the material. Vertical adjustment of the upper head is provided for by a pair of lift rods 265, 265 connected to the journal box cutter head shaft at 266, 266, the lower end of one of the lift rods 265 being pivotally connected to the arm 267 of an angle lever fulcrumed on the shaft 164 while the lower end of the companion lift rod 265 is pivoted to the arm 268 of an angle lever fulcrumed on the shaft 154. A second arm 269 of the angle lever mounted upon the shaft 164 is connected by a link 270 with an arm 271 of the angle lever fulcrumed upon the shaft 154. The arm 271 may be made integral or coupled with the arm 268 so as to move in unison therewith. The arm 272, moving in unison with the arm 271, is connected by means of a link 273 upstanding from the rock shaft 275 to which is secured the lever 276 by means of which the shaft 275 is rocked, said lever being held in adjusted position by means of the sector 277. It will be apparent that by means of the lever 276 the top cutter head 263 may be vertically adjusted to suit different thicknesses of material.

Within a frame or housing 278 formed integral with the journal mounting of the shaft 262 of the top cutter head and vertically adjustable therewith on a portion 279 of the machine frame are the hold down 280 and the chip breaker 281 for the top head and also the hold down shoe 257 previously referred to. The hold down 280 is adjustably guided at 282 in the frame 278 under the control of the springs 283 and the adjusting rod 284 while the chip breaker 281 is carried between the arms 286 connected by means of parallel links 287 and 288 with the frame 278, the chip breaker is downwardly pressed upon the surface of the material by means of springs 290 upon the rods 291 the forward ends of which engage within recesses of the links 288, the downward movement of the links being limited by the set screws 292.

The mounting of the top head, including the frame 278, is guided within the machine frame by means of lever castings 293, 294 fulcrumed upon the pivot 295 of the links 287 and adapted to be drawn together by means of the tie rod 296 upon the beveled guiding faces 297 of the machine frame 279 as most clearly shown in Fig. 15, for clamping the top head in adjusted position.

The vertical adjustment of the top head and the chip breaker and hold down shoes is facilitated by attachment thereto of cords 298 traversing pulleys 299 upon the axle 300 of which is carried a sector sheave 301, the surface of which is engaged by a cord 302 carrying a counterweight 303.

A set of out-rolls (Figs. 1, 10 and 18) is arranged immediately to the rear of the top head. The lower out-roll 304 has its axle 305 journaled within boxes 306 slightly adjustable vertically by means of the screws 307 while the upper out-roll 308 has its shaft 309 journaled in boxes 310 connected at 311 with lift rods 312, 312.

The shaft 154, previously referred to in connection with the adjustment of the in-roll, has keyed thereon an upwardly extending arm 313 (Fig. 18) connected by rods 314 with a cross head 315, which latter is guided by the rod 316 secured at one end to the arm 317 and at the other end to a cross head 318 guided upon the rods 314. Springs 319 are mounted upon the rods 314 between the cross heads 315 and 318 whereby the connection between the arms 313 and 317 is constituted a yielding one. The arm 317 is loosely mounted upon the shaft 164, previously referred to, and forms part of a T-lever having an arm 320 extending horizontally to a connection with one of the lift rods 312 and another arm 321 extending vertically downward. The arm 321 is connected by means of a link 322 with an arm 323 mounted loosely upon the shaft 154 and having an integral horizontally extending arm 324 which is connected with the lower end of the companion lift rod 312. The means provided for vertically adjusting the upper out-roll 308 is practically identical with that previously described in connection with the adjustment of the upper in-roll 119 and the adjustment of these two rolls is effected simultaneously and in unison by means of the lever 155.

The out-roll 308 is mounted for vertical movement within guides 325 of the machine frame and this vertical movement is facilitated by the cords 326 connecting the journal boxes 310 and extending over the pulleys 327 on the shaft 328. Keyed on said shaft is a sector sheave 329 the surface of which is traversed by a cord 330 carrying a counterweight 331.

A bed plate section 332 is mounted on the machine frame at the rear of the lower cutter head 243 with which it coöperates, said plate section being held in adjusted position by means of the bolts 333, 333 passing through slots in the machine frame and having its upper face disposed substantially in the horizontal plane and forming a portion of the machine bed upon which the material rests while passing beneath the upper cutter head 263.

Various working parts of the machine proper are driven in the manner following (Figs. 1, 2, 3, 5, 6, 8 and 24): Upon the shaft 351, driven from any suitable source of power, is mounted on the front side of the machine a drive pulley 352 traversed by a belt 353 which passes around the driven pulley 354 of the top head, said belt being maintained taut by the idler 355 resting thereon. Another belt 356 engages the lower face of the drive pulley 352 and passes around the idlers 357 and 358, the latter of which maintains a tension upon said belt which then passes around the driven pulley 245 of the bottom head, the effect of the two belts 353 and 356 driven by the one pulley 352 in the manner stated, is to cause the rotation of the top and bottom heads in opposite directions and at the same speed.

Upon the rear side of the machine a duplicate drive for the top and bottom heads is attained by means of the drive pulley 352$^a$ with which coöperate the tighteners 355$^a$, 357$^a$ and 358$^a$, the belts from the pulley 352$^a$ traversing the driven pulleys on the rear ends of the shafts of the top and bottom heads.

Upon the shaft 351 is likewise mounted a pulley 360 traversed by a belt 361 leading to the driven pulley 222 of the inside head while another pulley 362 on the shaft 351 is traversed by a belt 363 leading to the drive pulley 183 of the outside head. It will thus be seen that the inside and outside heads are driven the same peripheral speeds in opposite directions, both belts 361 and 363 are maintained taut by idlers resting thereon, one of which is indicated at 364.

Upon the opposite side of the machine upon the shaft 351 is fixed a pulley 365 from which a belt leads by way of the tightener 84 to the pulley 35 for the feed table mechanism. Upon the same shaft 351 a pulley 366 is fixed to drive the pulley 367 by suitable belt connections, not shown, said belt traversing the belt tightener 368. The shaft 369 of the pulley 367 carries a gear member 370 in mesh with a similar gear member 371 inclosed within the gear case 372 (Fig. 6). The gear member 371 is keyed to a shaft 373 carrying a sprocket 374. This sprocket is traversed by an endless chain 375 which passes around an idler sprocket 376, a sprocket 377 on the shaft 120 of the upper in-roll 119, thence around a sprocket 378 on the shaft 309 of the out-roll 308, thence around the idler sprocket 379, and thence around a belt tightener sprocket 380 mounted in an angle frame 381 to which is attached a tightener rod 382 mounted within a guide 383 and surrounded by a spring 384 by means of which the chain 375 is kept under yielding tension. Thus it will be seen that by means of the chain 375 the upper members of the in and out rolls are driven in the same direction at the same peripheral speed. Upon the shaft 385 of the idler sprocket 376 is likewise mounted a sprocket 386 traversed by a chain 387 which drives a sprocket 388 mounted upon the shaft 118ª of the lower in-roll 118. Similarly upon the shaft 388 of the idler sprocket 379 is mounted another sprocket 389 traversed by a chain 390 by which is driven a sprocket 391 upon the shaft 305 of the lower out-roll 304.

The adjustment of the various parts of the machine proper is effected, as above stated, by means of a series of rock shafts extending in parallel relation longitudinally of the machine, the two superjacent rock shafts 154 and 233 being disposed inwardly of the three of the similarly arranged rock shafts 275, 197 and 230. These rock shafts all extend to a position at the side of the machine between the feed table and the machine proper and are provided with their respective levers all arranged, together with the levers for operating the feed table, within easy reach of the workman without moving from one spot. It will thus be seen that the operator is able to control absolutely the vertical adjustment of the top and bottom heads and of the in and out rolls; the lateral and vertical adjustment of the outside and inside heads to suit the requirements as to size and required finish of the material fed to the machine; also to interrupt and resume the supply of material to the feed table and the feeding of the same to the machine, while the sectional guiding gages automatically adjust themselves to the width of the material entering the machine. Thus the one machine in a very compact space is adapted for the handling and finishing of material of varying size in a most expeditious and efficient manner.

I claim:

1. The combination with a machine including tools for acting on material supplied thereto, of an abutment gage for the material, said gage automatically adjusted by the entering material to adapt the same for material of varying stock dimensions, and a laterally positionable guide for directing the material to the gage.

2. The combination with a machine including tools for acting on material supplied thereto, of a sectional abutment gage for the material, certain sections arranged to be engaged by the entering material and rendered inoperative whereby to vary the effective part of the gage to suit material of varying stock dimensions, and a laterally positionable guide for directing the material to the gage.

3. The combination with a machine including tools for acting on material supplied thereto, of a sectional abutment gage for the material, said gage disposed in the path of the advancing material whereby certain sections corresponding to the width of the material will be engaged and rendered inoperative whereby to vary the effective part of the gage to suit material of varying stock dimensions, and a laterally positionable guide for directing the material to the gage.

4. The combination with a machine including tools for acting on material supplied thereto, of a sectional abutment gage for the material, said gage disposed in the path of the advancing material whereby certain sections corresponding to the width of the material will be engaged and caused to override the same while the remaining sections will constitute a laterally supporting guide for the material, and a laterally positionable guide for directing the material to the gage.

5. The combination with a machine including tools for acting on material supplied thereto, of a sectional abutment gage comprising a series of members arranged in planes parallel to the path of the advancing material and mounted for independent movement in a vertical direction, certain of the sections adapted to be individually engaged by and lifted out of the path of the entering material, those members not so engaged remaining in place as a lateral guide and support for the material, and a laterally positionable guide for directing the material to the gage.

6. The combination with a machine including tools for acting on material supplied thereto, of a sectional abutment gage comprising a series of spring pressed members suspended in planes parallel to the path of the advancing material for independent vertical movement out of said path, certain of said members adapted to be individually engaged by the advancing material and caused to override the same, those members not so engaged remaining in place as a lateral guide and support for the material, and a laterally adjustable guide for directing the material to the gage.

7. The combination with a machine including tools for acting on material supplied thereto, of a sectional abutment gage for the material, said gage disposed in the path of the advancing material whereby certain sections corresponding to the width of the material will be engaged and caused to over-ride the same while the remaining sections will constitute a laterally supporting guide for the material, manually controlled means for vertically positioning the sectional gage as a whole, and a guide manually positionable to accord with the width of the material for directing the same into the gage.

8. The combination with a machine including tools for acting on material supplied thereto, of a sectional abutment gage comprising a series of spring pressed members suspended in planes parallel to the path of the advancing material for independent vertical movement out of said path, certain of said members adapted to be individually engaged by the advancing material and caused to over-ride the same, those members not so engaged remaining in place as a lateral guide and support for the material, manually controlled means for vertically adjusting the sectional gage as a whole, and a guide manually positionable to accord with the width of the material for directing the same into the gage.

9. The combination with a machine including tools for acting on materials supplied thereto, of an automatic gage for the material entering said machine and comprising a frame, a sectional gage attached to said frame and comprising a series of links hinged to the frame side by side for independent movement, a spring connecting the link and the frame and arranged to yieldingly hold the link in a predetermined normal position, a gage shoe pivoted to the free portion of the link, the gage shoes bearing laterally one against another and adapted to be individually engaged by and moved out of the path of the entering material in opposition to the springs, the gage shoes not engaged by the material remaining in place as a lateral guide and support for the material, and a guide manually positionable to accord with the width of the material for directing the same into the gage.

10. The combination with a machine including tools for acting on material supplied thereto, of an automatic gage for the material entering said machine and comprising a frame, a sectional gage attached to said frame and comprising a series of links hinged to the frame side by side for independent movement, a spring connecting the link and the frame and arranged to yieldingly hold the link in a predetermined normal position, a gage shoe pivoted to the free portion of the link, a set device limiting the tilting of the front end of the shoe relative to the link in one direction while leaving it free to tilt in the opposite direction, the gage shoes bearing laterally one against another and adapted to be individually engaged by and moved out of the path of the entering material in opposition to the springs, the gage shoes not engaged by the material remaining in place as a lateral guide and support for the material.

11. The combination with a machine including tools for acting on materials supplied thereto, of an automatic gage for the material entering said machine and comprising a frame, a sectional gage attached to said frame and comprising a series of links hinged to the frame side by side for independent movement, a spring connecting the link and the frame and arranged to yieldingly hold the link in a predetermined normal position, a gage shoe pivoted to the free portion of the link, a set device limiting the tilting of the front end of the shoe relative to the link in one direction while leaving it free to tilt in the opposite direction and having a beveled front end, the gage shoes bearing laterally one against another and adapted to be individually engaged by and moved out of the path of the entering material in opposition to the springs, the gage shoes not engaged by the material remaining in place as a lateral guide and support for the material.

12. The combination with a machine including tools for acting on materials supplied thereto, of an automatic gage for the material entering said machine and comprising a frame, a sectional gage attached to the frame, the gage comprising a series of gage links suspended from the frame side by side for independent vertical movement, a spring connecting a link and the frame arranged to yieldingly hold the link in a predetermined normal position, a gage shoe pivoted to the free portion of the link, the gage shoes bearing laterally one against another and adapted to be individually engaged by and lifted out of the path of the entering material in opposition to the springs, the engaged shoes riding on top of the material and those not so engaged remaining in place as a lateral guide and support for the material, and a guide manually positionable to accord with the width of the material for directing the same into the gage.

13. The combination with a machine including tools for acting on materials supplied thereto, of an automatic gage for the material entering said machine and comprising a frame, a sectional gage attached to the frame, the gage comprising a series of gage links suspended from the frame side by side for independent vertical movement, a spring connecting a link and the frame arranged to yieldingly hold the link in a predetermined normal position, a gage shoe pivoted to the free portion of the link, a set device limiting the tilting of the front end of the shoe relative to the link in an upward direction while leaving it free to tilt in the opposite direction, the gage shoes bearing laterally one against another and adapted to be individually engaged by and lifted out of the path of the entering material in opposition to the springs, the engaged shoes riding on top of the material and those not so engaged remaining in place as a lateral guide and support for the material.

14. The combination with a machine including tools for acting on materials supplied thereto, of an automatic gage for the material entering said machine and comprising a frame, a sectional gage attached to said frame and comprising a series of links hinged to the frame side by side for independent movement, a spring connecting the link and the frame and arranged to yieldingly hold the link in a predetermined normal position, a gage shoe pivoted to the free portion of the link, the gage shoes bearing laterally one against another and adapted to be individually engaged by and moved out of the path of the entering material in opposition to the springs, the gage shoes not engaged by the material remaining in place as a lateral guide and support for the material, and means to bodily adjust the frame and attached gages in a vertical direction, and a guide manually positionable to accord with the width of the material for directing the same into the gage.

15. The combination with a machine including tools for acting on materials supplied thereto, of an automatic gage for the material entering said machine and comprising a frame guided for vertical movement, a sectional gage attached to the frame, the gage comprising a series of gage links hinged to the frame side by side for independent movement, a spring connecting the link and the frame and arranged to yieldingly hold the link in a predetermined normal position, a gage shoe pivoted to the free portion of the link, the gage shoes bearing laterally one against another and adapted to be individually engaged by and moved out of the path of the entering material in opposition to the springs, the gage shoes not engaged by the material remaining in place as a lateral guide and support for the material, means to bodily adjust the frame and attached gages in a vertical direction, and a guide manually adjustable to accord with the width of the material for directing the same into the gage.

16. The combination with a machine including tools for acting on materials supplied thereto, of an automatic gage for the material entering said machine and comprising a frame pivotally supported at one end, guiding blocks pivotally mounted near the free end of the frame and traveling in vertical guides, a transversely extending series of gage links hinged to the guiding blocks side by side for independent swinging movement, springs connecting the links with the frame and arranged to oppose the upward movement of the links, gage shoes carried by the free ends of the links and adapted to be individually engaged by and moved upwardly out of the path of the entering material in opposition to the springs, the engaged shoes riding on top of the material and those not so engaged remaining in place as a lateral guide and support for the material, a lever controlled rock shaft, and a link connection between the rock shaft and guiding blocks whereby to adjust the vertical height of the frame.

17. The combination with a machine including tools for acting on materials supplied thereto, of an automatic gage for the material entering said machine and comprising a frame pivotally supported at one end, guiding blocks pivotally mounted near the free end of the frame and traveling in vertical guides, a transversely extending series of gage links hinged to the guiding blocks side by side for independent swinging movement, springs connecting the links with the frame and arranged to oppose the upward movement of the links, gage shoes carried by the free ends of the links and adapted to be individually engaged by and moved upwardly out of the path of the entering material in opposition to the springs, the engaged shoes riding on top of the material and those not so engaged remaining in place as a lateral guide and support for the material, a pair of rock shafts, angularly disposed arms carried by each shaft, links connecting an arm of each shaft with the guiding blocks, another link connecting the other arm of the two shafts, and a lever for rocking the shaft whereby to adjust the vertical height of the frame.

18. The combination with a machine including tools for acting on materials supplied thereto, of an automatic gage for the material entering said machine and comprising a frame pivotally supported at one end, guiding blocks pivotally mounted near the free end of the frame and traveling in vertical guides, two sets of transversely extending series of gage links, one set hinged to the guiding block and the other set to the frame in the rear of the first set side by side for independent swinging movement, springs connecting the links and frame and arranged to yieldingly oppose the upward movement of the links, gage shoes pivoted to the free portion of the links, the gage shoes bearing laterally one against another and adapted to be individually engaged by and moved out of the path of the entering material in opposition to the springs, the engaged shoes riding on top of the material and those not so engaged remaining in place as a lateral guide and support for the material, means to adjustably support the guide blocks, a hold-down shoe mounted on the frame alongside the second set of gage members for vertical movement, and a spring pressing the shoe downward, the shoe adapted to over-ride the front end of the approaching material and to exert yielding downward pressure upon the upper surface thereof.

19. The combination with a machine including tools for acting on materials supplied thereto, of an automatic gage for the material entering said machine and comprising a frame pivotally supported at one end, guiding blocks pivotally mounted near the free end of the frame and traveling in vertical guides, two sets of transversely extending series of gage links, one set hinged to the guiding block and the other set to the frame in the rear of the first set side by side for independent swinging movement, springs connecting the links and frame and arranged to yieldingly oppose the upward movement of the links, gage shoes pivoted to the free portion of the links, the gage shoes bearing laterally one against another and adapted to be individually engaged by and moved out of the path of the entering material in opposition to the springs, the engaged shoes riding on top of the material and those not so engaged remaining in place as a lateral guide and support for the material, means to adjustably support the guide blocks, and a hold-down shoe comprising parallel links pivoted to the frame and extending downwardly and rearwardly therefrom, a shoe proper carried by the lower ends of the links alongside the second set of gage members, a compression spring disposed between the heel of the shoe and the frame whereby to oppose upward movement of the shoe, the shoe adapted to override the front end of the projecting material and to exert yielding pressure upon the upper surface thereof.

20. The combination with a machine including tools for acting on materials supplied thereto, of an automatic gage for the material entering said machine and comprising a frame pivotally supported at one end, guiding blocks pivotally mounted near the free end of the frame and traveling in vertical guides, two sets of transversely extending series of gage links, one set hinged to the guiding block and the other set to the frame in the rear of the first set side by side for independent swinging movement, springs connecting the links and frame and arranged to yieldingly oppose the upward movement of the links, gage shoes pivoted to the free portion of the links, the gage shoes bearing laterally one against another and adapted to be individually engaged by and moved out of the path of the entering material in opposition to the springs, the engaged shoes riding on top of the material and those not so engaged remaining in place as a lateral guide and support for the material, means to adjustably support the guide blocks, a hold-down shoe mounted on the frame alongside the second set of gage members for vertical movement, and a spring pressing the shoe downward, the shoe adapted to over-ride the front end of the approaching material and to exert yielding downward pressure upon the upper surface thereof, and means connected with the guiding blocks to vertically adjust the forward end of the frame and its attached gage members.

21. The combination with a machine including tools for acting on materials supplied thereto, of an automatic gage for the material entering said machine and comprising a frame pivotally supported at one end, guiding blocks pivotally mounted near the free end of the frame and traveling in vertical guides, two sets of transversely extending series of gage links, one set hinged to the guiding block and the other set to the frame in the rear of the first set side by side for independent swinging movement, springs connecting the links and frame and arranged to yieldingly oppose the upward movement of the links, gage shoes pivoted to the free portion of the links, the gage shoes bearing laterally one against another and adapted to be individually engaged by and moved out of the path of the entering material in opposition to the springs, the engaged shoes riding on top of the material and those not so engaged remaining in place as a lateral guide and support for the material, means to adjustably support the guide blocks, a hold-down shoe mounted on the frame alongside the second set of gage members for vertical movement, and a spring pressing the shoe downward, the shoe adapted to over-ride the front end of the approaching material and to exert yielding downward pressure upon the upper surface thereof, means connected with the guiding blocks to vertically adjust the forward end of the frame and its attached gage members, a lever controlled rock shaft, a link connection between the rock shaft and the guiding blocks whereby to vertically adjust the frame and the members carried thereby, and a guide manually adjustable to accord with the width of the material for directing the same into the gage.

22. The combination with a machine including tools for acting on materials supplied thereto, of an automatic gage for the material entering said machine and comprising a frame pivotally supported at one end, guiding blocks pivotally mounted near the free end of the frame and traveling in vertical guides, two sets of transversely extending series of gage links, one set hinged to the guiding block and the other set to the frame in the rear of the first set side by side for independent swinging movement, springs connecting the links and frame and arranged to yieldingly oppose the upward movement of the links, gage shoes pivoted to the free portion of the links, the gage shoes bearing laterally one against another and adapted to be individually engaged by and moved out of the path of the entering material in opposition to the springs, the engaged shoes riding on top of the material and those not so engaged remaining in place as a lateral guide and support for the material, means to adjustably support the guide blocks, a hold-down shoe mounted on the frame alongside the second set of gage members for vertical movement, and a spring pressing the shoe downward, the shoe adapted to over-ride the front end of the approaching material and to exert yielding downward pressure upon the upper surface thereof, means connected with the guiding blocks to vertically adjust the forward end of the frame and its attached gage members, a pair of shafts each having angularly disposed arms, links connecting an arm of each shaft with the guiding blocks, a connection between other arms of the two shafts, and means to rock the arms whereby to vertically adjust the frame and its attached members.

23. The combination with a machine including tools for acting on materials supplied thereto, of an automatic gage for the material entering said machine and comprising a frame pivotally supported at one end, guiding blocks pivotally mounted near the free end of the frame and traveling in vertical guides, two sets of transversely extending series of gage links, one set hinged to the guiding block and the other set to the frame in the rear of the first set side by side for independent swinging movement, springs connecting the links and frame and arranged to yieldingly oppose the upward movement of the links, gage shoes pivoted to the free portion of the links, the gage shoes bearing laterally one against another and adapted to be individually engaged by and moved out of the path of the entering material in opposition to the springs, the engaged shoes riding on top of the material and those not so engaged remaining in place as a lateral guide and support for the material, means to adjustably support the guide blocks, a hold-down shoe comprising parallel links pivoted to the frame and extending downwardly and rearwardly therefrom, a shoe proper carried by the lower ends of the links alongside the second set of gage members, a compression spring disposed between the heel of the shoe and the frame whereby to oppose upward movement of the shoe, the shoe adapted to over-ride the front end of the projecting material and to exert yielding pressure upon the upper surface thereof, a pair of parallel shafts, T-levers mounted on each of the shafts and each comprising an upwardly extending, a horizontally extending, and a downwardly extending arm, links connecting the horizontally extending arms of the two levers with the guiding blocks, a rigid link connecting a pair of the vertically extending arms of the two levers, a yielding spring connection between the other pair of vertically extending arms of the two levers, the arms of one of the T-levers having fixed relation to each other and one of the vertical arms of the other T-lever having angular movement independent of the other two arms of said lever, the movable arm of the second lever keyed upon one of the shafts, and means for rocking said shaft whereby to provide for manual vertical adjustment of the frame and also to provide for vertical yielding of the frame independently of the adjustment.

24. The combination with a machine including tools for acting on material supplied thereto, of an abutment gage for the material, said gage automatically adjusted by the entering material to adapt the same for material of varying stock dimensions, and a feed table for automatically positioning the material relative to the gage comprising a longitudinal series of transversely disposed driven rollers adapted to receive lengths of the material to be fed and provided with means to shift the material transversely of the series, a longitudinally disposed guide rail for intercepting the material in its lateral movement and guiding the same in its longitudinal movement.

25. The combination with a machine including tools for acting on material supplied thereto, of an abutment gage for the material, said gage automatically adjusted by the entering material to adapt the same for material of varying stock dimensions, and a feed table for automatically positioning the material relative to the gage comprising a longitudinal series of transversely disposed helically grooved driven rollers adapted to receive lengths of material to be fed, a longitudinally disposed guide rail for intercepting the material in its lateral movement under the influence of the helical grooves and for guiding the same in its longitudinal movement, a friction faced wheel arranged opposite the guide adjacent the delivery from the table whereby the material received between the guide and wheel will be delivered therefrom by the wheel.

26. The combination with a machine including tools for acting on material supplied thereto, of a sectional abutment gage for the material, certain sections arranged to be engaged by the entering material and rendered inoperative whereby to vary the effective part of the gage to suit material of varying stock dimensions, and a feed table for automatically positioning the material relative to the gage comprising a longitudinal series of transversely disposed driven rollers adapted to receive lengths of the material to be fed and provided with means to shift the material transversely of the series, a longitudinally disposed guide rail for intercepting the material in its lateral movement and guiding the same in its longitudinal movement.

27. The combination with a machine including tools for acting on material supplied thereto, of a sectional abutment gage comprising a series of members arranged in planes parallel to the path of the advancing material and mounted for independent movement in a vertical direction, certain of the sections adapted to be individually engaged by and lifted out of the path of the entering material, those members not so engaged remaining in place as a lateral guide and support for the material, and a feed table for automatically positioning the material relative to the gage comprising a longitudinal series of transversely disposed driven rollers adapted to receive lengths of the material to be fed and provided with means to shift the material transversely of the series, a longitudinally disposed guide rail for intercepting the material in its lateral movement and guiding the same in its longitudinal movement.

28. The combination with a machine including tools for acting on material supplied thereto, of a sectional abutment gage comprising a series of members arranged in planes parallel to the path of the advancing material and mounted for independent movement in a vertical direction, certain of the sections adapted to be individually engaged by and lifted out of the path of the entering material, those members not so engaged remaining in place as a lateral guide and support for the material, and a feed table for automatically positioning the material relative to the gage comprising a longitudinal series of transversely disposed helically grooved driven rollers adapted to receive lengths of material to be fed, a longitudinally disposed guide rail for intercepting the material in its lateral movement under the influence of the helical grooves and for guiding the same in its longitudinal movement, a rocker arm carrying said guide, a lever arranged to rock said arm to position the guide, a spur wheel mounted upon a vertical driven shaft opposite the guide, and means for pressing the mounting of the spur wheel toward the guide whereby the material received between the guide and wheel will be fed therefrom by the latter.

29. The combination with a machine including tools for acting on material supplied thereto, an abutment gage for the material, said gage automatically adjusted by the entering material to adapt the same for material of varying stock dimensions, of a cutter head provided with tools for acting upon the material on that side opposite the gage.

30. The combination with a machine including tools for acting on material supplied thereto, an abutment gage for the material, said gage automatically adjusted by the entering material to adapt the same for material of varying stock dimensions, of a cutter head provided with tools for acting upon the material on that side opposite the gage, and means to adjust the cutter head toward and from the material.

31. The combination with a machine including tools for acting on material supplied thereto, an abutment gage for the material, said gage automatically adjusted by the entering material to adapt the same for material of varying stock dimensions, of a cutter head provided with tools for acting on the material on that side opposite the gage, yielding means to press the cutter head away from the material, and manually operable means to force the cutter head toward the material in opposition to the yielding means.

32. The combination with a machine including tools for acting on material supplied thereto, an abutment gage for the material, said gage automatically adjusted by the entering material to adapt the same for material of varying stock dimensions, of a cutter head provided with tools for acting upon the material, a pivoted bracket bearing for the cutter head shaft arranged to allow the cutter head to swing toward and from the material, a spring pressed plunger acting against the inner face of the bracket to yieldingly press the same away from the material, a cam shaft, a cam on said shaft arranged to bear against the bracket, and means for rocking said shaft whereby to adjustably force the bracket toward the material in opposition to the spring pressed plunger.

33. The combination with a machine including tools for acting on material supplied thereto, an abutment gage for the material, said gage automatically adjusted by the entering material to adapt the same for material of varying stock dimensions, of a cutter head provided with tools for acting upon the material, a pivoted bracket bearing for the cutter head shaft arranged to allow the cutter head to swing toward and from the material, yielding means to press the bracket away from the material, manually operable means to adjustably force the bracket toward the material in opposition to the yielding means, a cam shaft underlying the bracket, a cam on said shaft bearing upwardly against the bracket, and means to rock the shaft whereby to vertically adjust the bracket and cutter head.

34. The combination with a machine including tools for acting on material supplied thereto, an abutment gage for the material, said gage automatically adjusted by the entering material to adapt the same for material of varying stock dimensions, of a cutter head provided with tools for acting upon the material, a pintle mounted in the machine frame for angular and limited axial movement, a bearing bracket for the cutter head mounted thereon at one side thereof, a cam shaft bearing on the bracket, means to rock the shaft to move the cutter head toward and from the work, a second cam shaft bearing upwardly on the lower end of the pintle, and means to rock the second shaft to raise and lower the cutter head relative to the work.

35. The combination with a machine including tools for acting on materials supplied thereto, of an automatic gage for the material entering said machine and comprising a frame pivotally supported at one end, guiding blocks pivotally mounted near the free end of the frame and traveling in vertical guides, a transversely extending series of gage links hinged to the guiding blocks side by side for independent swinging movement, springs connecting the links with the frame and arranged to oppose the upward movement of the links, gage shoes carried by the free ends of the links and adapted to be individually engaged by and moved upwardly out of the path of the entering material in opposition to the springs, the engaged shoes riding on top of the material and those not so engaged remaining in place as a lateral guide and support for the material, a cutter head mounted for vertical movement in the machine frame and arranged to act upon the material passing thereunder, a frame adjustable vertically with the cutter head, said frame serving as a pivotal mounting for the rear portion of the gage-supporting frame, a lever controlled rock shaft, arms projecting therefrom, and link connections between one of said arms and the guiding blocks and also between the other of said arms and the cutter head whereby the gages and the cutter head will be vertically adjusted in unison.

In testimony whereof I have hereunto signed my name in the presence of two subscribing witnesses.

HARRISON J. MITCHELL.

Witnesses:
F. A. HORSTMANN,
M. HERRMANN.